US008243202B2

(12) United States Patent
Zhu et al.

(10) Patent No.: US 8,243,202 B2
(45) Date of Patent: Aug. 14, 2012

(54) METHOD AND SYSTEM FOR A GENERALIZED MULTI-DIMENSIONAL FILTER DEVICE

(75) Inventors: Qiang Zhu, Shanghai (CN); Wei Luo, Shanghai (CN); Dongjian Wang, Shanghai (CN); Chuan Chen, Shanghai (CN); XiaoHong Di, Shanghai (CN); Xavier Lacarelle, Bagnolet (FR); Wu Huang, Shanghai (CN)

(73) Assignee: Broadcom Corporation, Irvine, CA (US)

( * ) Notice: Subject to any disclaimer, the term of this patent is extended or adjusted under 35 U.S.C. 154(b) by 499 days.

(21) Appl. No.: 12/570,599

(22) Filed: Sep. 30, 2009

(65) Prior Publication Data

US 2011/0075041 A1 Mar. 31, 2011

(51) Int. Cl.
*H04N 9/77* (2006.01)
(52) U.S. Cl. .................... 348/663; 348/665
(58) Field of Classification Search ........... 348/663, 348/665, 667–670, 712–713, 450–451, 453, 348/708, 624; 382/167, 278, 260–265, 300; H04N 9/77, 9/78, 9/64
See application file for complete search history.

(56) References Cited

U.S. PATENT DOCUMENTS

| 5,585,861 A * | 12/1996 | Taniguchi et al. ............ 348/669 |
| 6,037,986 A * | 3/2000 | Zhang et al. ............. 375/240.12 |
| 6,188,730 B1 * | 2/2001 | Ngai et al. ............... 375/240.21 |
| 7,113,226 B2 * | 9/2006 | Meiners ........................ 348/663 |

* cited by examiner

*Primary Examiner* — Trang U Tran
(74) *Attorney, Agent, or Firm* — Sterne, Kessler, Goldstein & Fox PLLC

(57) ABSTRACT

Aspects of a method and system for a generalized multi-dimensional filter device are provided. A corresponding luma component and a corresponding chroma component of a sample of a composite video baseband signal for each of a plurality of filtering modes may be determined. A similarity level of the sample corresponding to each of the plurality of filtering modes may be determined. A corresponding coefficient for each of the plurality of filtering modes may be generated based on the determined similarity levels. A luma component and a chroma component of the sample of the composite video baseband signal may be generated based on the generated corresponding coefficients and the determined corresponding luma components and the determined corresponding chroma components for each of the plurality of filtering modes.

30 Claims, 12 Drawing Sheets

METHOD AND SYSTEM FOR A GENERALIZED MULTI-DIMENSIONAL FILTER DEVICE

CROSS-REFERENCE TO RELATED APPLICATIONS/INCORPORATION BY REFERENCE

None.

FIELD OF THE INVENTION

Certain embodiments of the invention relate to video processing. More specifically, certain embodiments of the invention relate to a method and system for a generalized multi-dimensional filter device.

BACKGROUND OF THE INVENTION

Analog video may be received through broadcast, cable, and VCRs. The reception is often corrupted by noise, and therefore to improve the visual quality, noise reduction may be needed. Digital video may be received through broadcast, cable, satellite, Internet, and video discs. Digital video may be corrupted by noise, which may include coding artifacts, and to improve the visual quality and coding gain, noise reduction may be beneficial. Various noise filters have been utilized in video communication systems such as set top boxes. However, inaccurate noise characterization, especially during scenes with motion, may result in artifacts caused by the filtering, which are more visually detrimental than the original noise.

In video system applications, random noise present in video signals, such as National Television System(s) Committee (NTSC) or Phase Alternating Line (PAL) analog signals, for example, may result in images that are less than visually pleasing to the viewer and the temporal noise may reduce the video encoder coding efficiency. As a result, the temporal noise may affect the video quality of the encoded video stream with a given target bitrate. To address this problem, spatial and temporal noise reduction (NR) operations may be utilized to remove or mitigate the noise present. Traditional NR operations may use either infinite impulse response (IIR) filtering based methods or finite impulse response (FIR) filtering based methods. Temporal filtering may be utilized to significantly attenuate temporal noise. However, temporal filtering may result in visual artifacts such as motion trails, jittering, and/or wobbling at places where there is object motion when the amount of filtering is not sufficiently conservative. Spatial filtering may attenuate significantly high frequency noise or some narrow pass disturbing signals. However, spatial filtering may also attenuate the content spectrum, which may introduce blurriness artifacts in the active spatial filter areas.

Color information carried by a composite television (TV) signal may be modulated in quadrature upon a subcarrier. The subcarrier may have a frequency corresponding to the line scan frequency in a manner that may interleave the color information about the subcarrier between energy spectra of the luminance baseband signal. In color television systems such as NTSC and PAL, the color information comprises luminance (Y) and chrominance (C) information sharing a portion of the total signal bandwidth. Thus, a Y/C separation procedure in the receiving end may be required to extract the luminance and chrominance information individually. The luminance and chrominance information of some image areas, especially in image areas such as a motion edge of high frequency luminance, may not be distinguishable due to imperfect encoding techniques. For example, a television demodulator may incorrectly demodulate high frequency luminance information as chrominance information, causing color artifacts on vertical edges. These color artifacts may include, for example, color ringing, color smearing, and the display of color rainbows in place of high-frequency grayscale information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a generalized multi-dimensional filter device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a generalized multi-dimensional filter device. In various embodiments of the invention, a corresponding luma component and a corresponding chroma component of a sample of a composite video baseband signal for each of a plurality of filtering modes may be determined. A similarity level of the sample corresponding to each of the plurality of filtering modes may be determined. A corresponding coefficient for each of the plurality of filtering modes may be generated based on the determined similarity levels. A luma component and a chroma component of the sample of the composite video baseband signal may be generated based on the generated corresponding coefficients and the determined corresponding luma components and the determined corresponding chroma components for each of the plurality of filtering modes.

Figure 1:
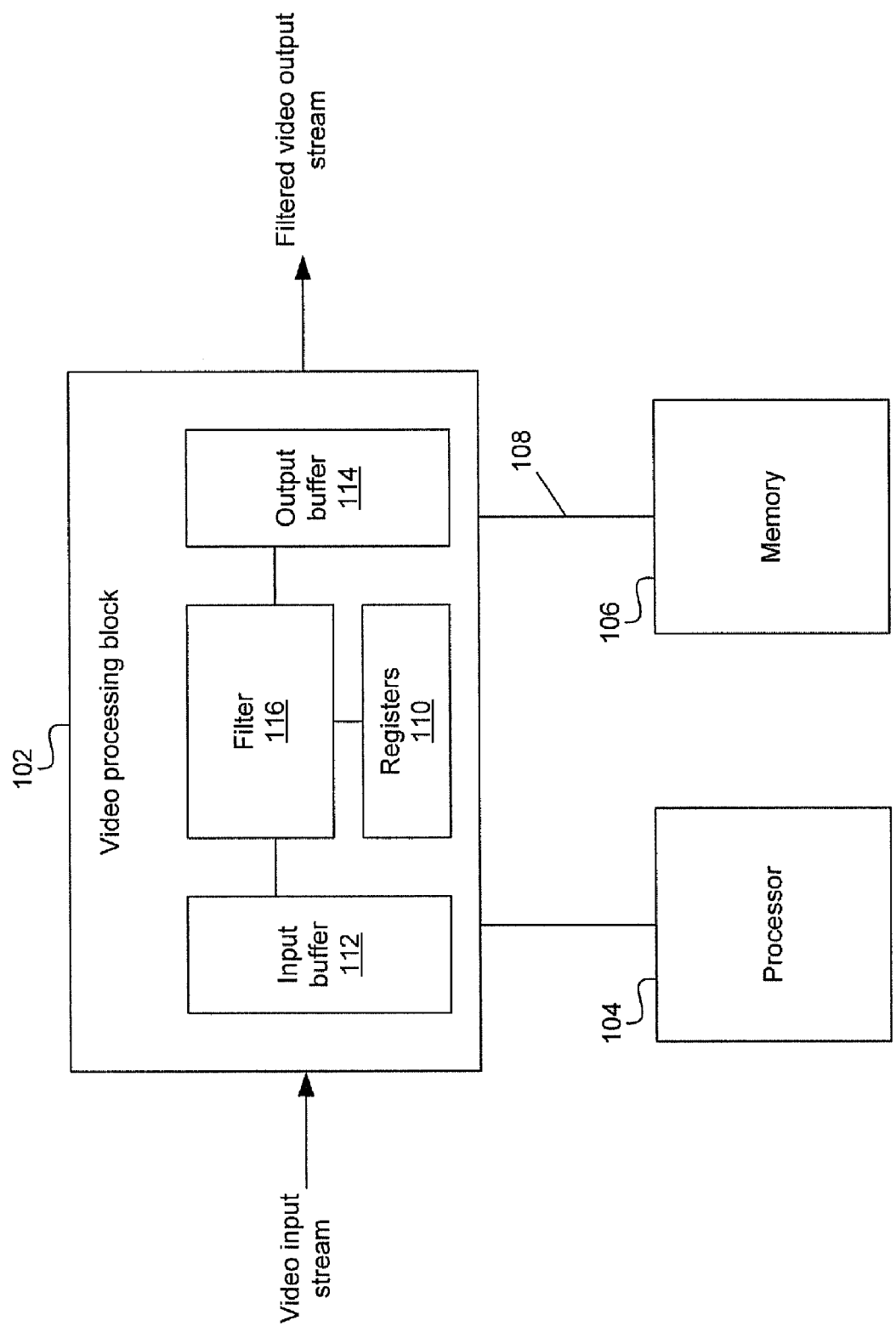
FIG. 1 is a block diagram of an exemplary video processing system, in accordance with an embodiment of the invention.

FIG. 1 is a block diagram of an exemplary video processing system, in accordance with an embodiment of the invention. Referring to FIG. 1, there is shown a video processing block 102, a processor 104, a memory 106, and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, interfaces, and/or code that may be operable to filter pixels in a video picture from a video input stream to separate luma (Y) and chroma (C) components. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing block 102 may be operable to receive a video input stream and, in some instances, to buffer at least a portion of the received video input stream in the input buffer 112. In this regard, the input buffer 112 may comprise suitable logic, circuitry, interfaces, and/or code that may be operable to store at least a portion of the received video input stream. Similarly, the video processing block 102 may be operable to generate a filtered video output stream and, in some instances, to buffer at least a portion of the generated filtered video output stream in the output buffer 114. In this regard, the output buffer 114 may comprise suitable logic, circuitry, interfaces, and/or code that may be operable to store at least a portion of the filtered video output stream.

The filter 116 in the video processing block 102 may comprise suitable logic, circuitry, interfaces, and/or code that may be operable to perform comb and/or notch filtering operations on a current pixel in a video picture to separate Y and C components. In this regard, the filter 116 may be operable to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. The registers 110 in the video processing block 102 may comprise suitable logic, circuitry, interfaces, and/or code that may be operable to store information that corresponds to filter coefficients, threshold levels, and/or constants, for example. Moreover, the registers 110 may be operable to store information that correspond to a selected filtering mode.

The processor 104 may comprise suitable logic, circuitry, interfaces, and/or code that may be operable to process data and/or perform system control operations. The processor 104 may be operable to control at least a portion of the operations of the video processing block 102. For example, the processor 104 may generate at least one signal to control the selection of the filtering mode in the video processing block 102. Moreover, the processor 104 may be operable to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108. The memory 106 may comprise suitable logic, circuitry, interfaces, and/or code that may be operable to store information that may be utilized by the video processing block 102 to separate Y and C components in the video input stream. The memory 106 may be operable to store filter coefficients, threshold levels, and/or constants, for example, to be utilized by the video processing block 102.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pixels in a video picture in accordance with the selected filtering mode. In some instances, the video input stream may be stored in the input buffer 112 before processing. The video processing block 102 may generate the appropriate blending factors needed to perform the Y/C separation filtering operation selected by the processor 104. The video processing block 102 may generate the filtered video output stream after performing the Y/C separation filtering operation. In some instances, the filtered video output stream may be stored in the output buffer 114 before being transferred out of the video processing block 102.

Figure 2:
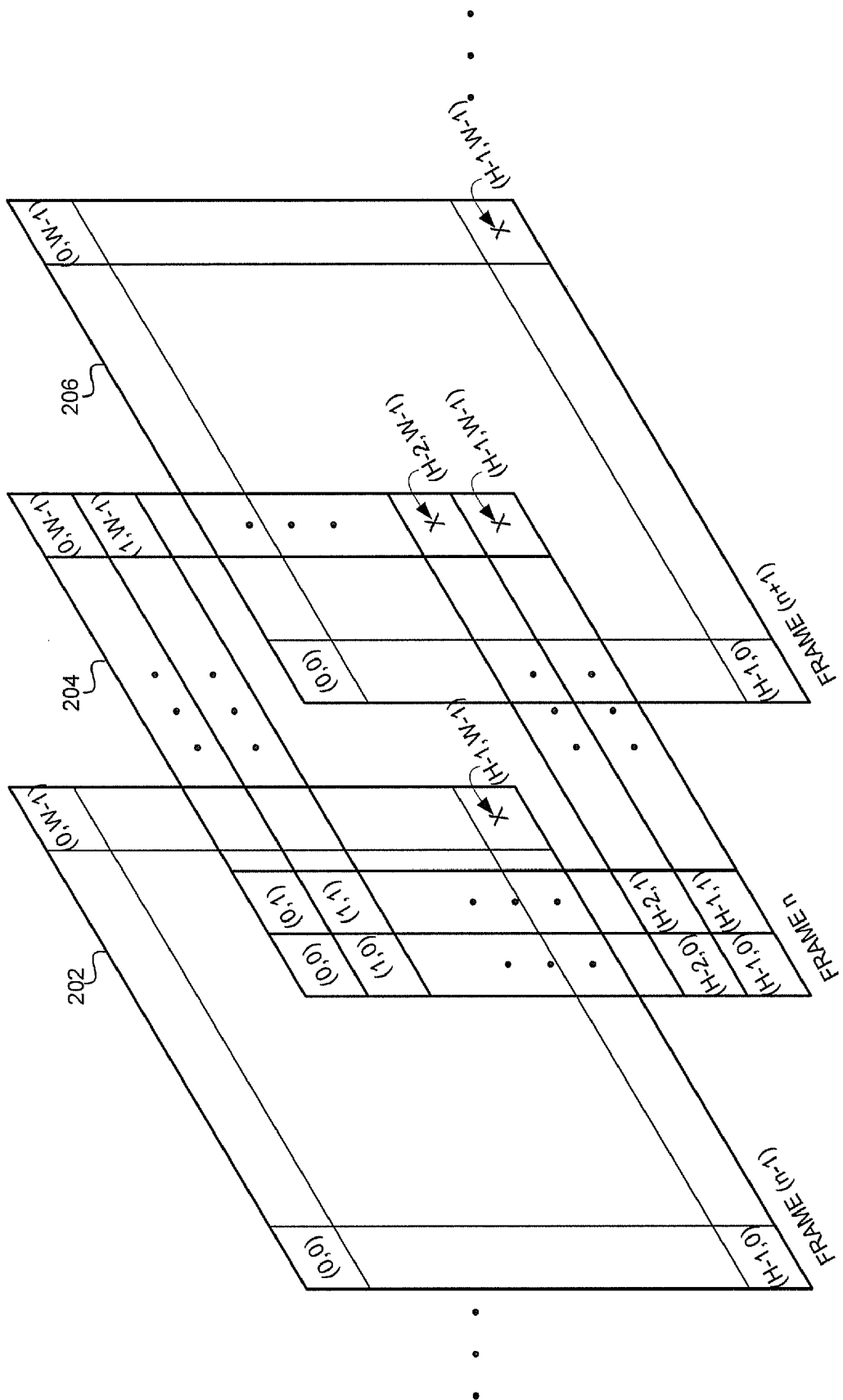
FIG. 2 is a diagram illustrating exemplary consecutive video pictures for Y/C separation operations, in connection with an embodiment of the invention.

FIG. 2 is a diagram illustrating exemplary consecutive video pictures for Y/C separation operations, in connection with an embodiment of the invention. Referring to FIG. 2, there is shown a current video picture 204, a previous video picture 202, and a next video picture 206. The current video picture 204 or PICTURE n may correspond to a current picture being processed by the video processing block 102 in FIG. 1. The previous video picture 202 or PICTURE (n−1) may correspond to an immediately previous picture to the current video picture 204. The next video picture 206 or PICTURE (n+1) may correspond to an immediately next picture to the current video picture 204. The previous video picture 202, the current video picture 204, and/or the next video picture 206 may be processed directly from the video input stream or after being buffered in the video processing block 102, for example. The current video picture 204, the previous video picture 206, and the next video picture 208 may comprise luma (Y) and/or chroma (Cb, Cr) information. In embodiments of the invention, where video fields are utilized as pictures, the previous video picture 202 may refer to the previous field of the same parity as the current video picture 204, and the next video picture 206 may refer to the next field of the same parity as the current picture 204. The previous, current and next video fields of the same parity may be referred to as consecutive video pictures.

Pixels in consecutive video pictures are said to be collocated when having the same picture location, that is, . . . , $P_{n-1}(x,y), P_n(x,y), P_{n+1}(x,y), \ldots$, where $P_{n-1}$ indicates a pixel value in the previous video picture 202, $P_n$ indicates a pixel value in the current video picture 204, $P_{n+1}$ indicates a pixel value in the next video picture 206, and (x,y) is the common picture location between pixels. As shown in FIG. 2, for the picture location, (x,y) is such that x=0, 1, ..., W−1 and y=0, 1, ..., H−1, where W is the picture width and H is the picture height, for example.

Operations of the video processing block 102 in FIG. 1 need not be limited to the use of exemplary consecutive video pictures as illustrated in FIG. 2. For example, the video processing block 102 may perform filtering operations on consecutive video fields of the same parity, that is, on consecutive top fields or consecutive bottom fields. When performing noise reduction operations on consecutive video fields of the same parity, pixels in the video processing block 102 are said to be collocated when having the same picture location, that is, ..., $P_{n-1}(x,y), P_n(x,y), P_{n+1}(x,y), ...$, where $P_{n-1}$ indicates a pixel value in a previous video field, $P_n$ indicates a pixel value in a current video field, $P_{n+1}$ indicates a pixel value in a next video field, and (x,y) is the common picture location between pixels.

Figure 3:
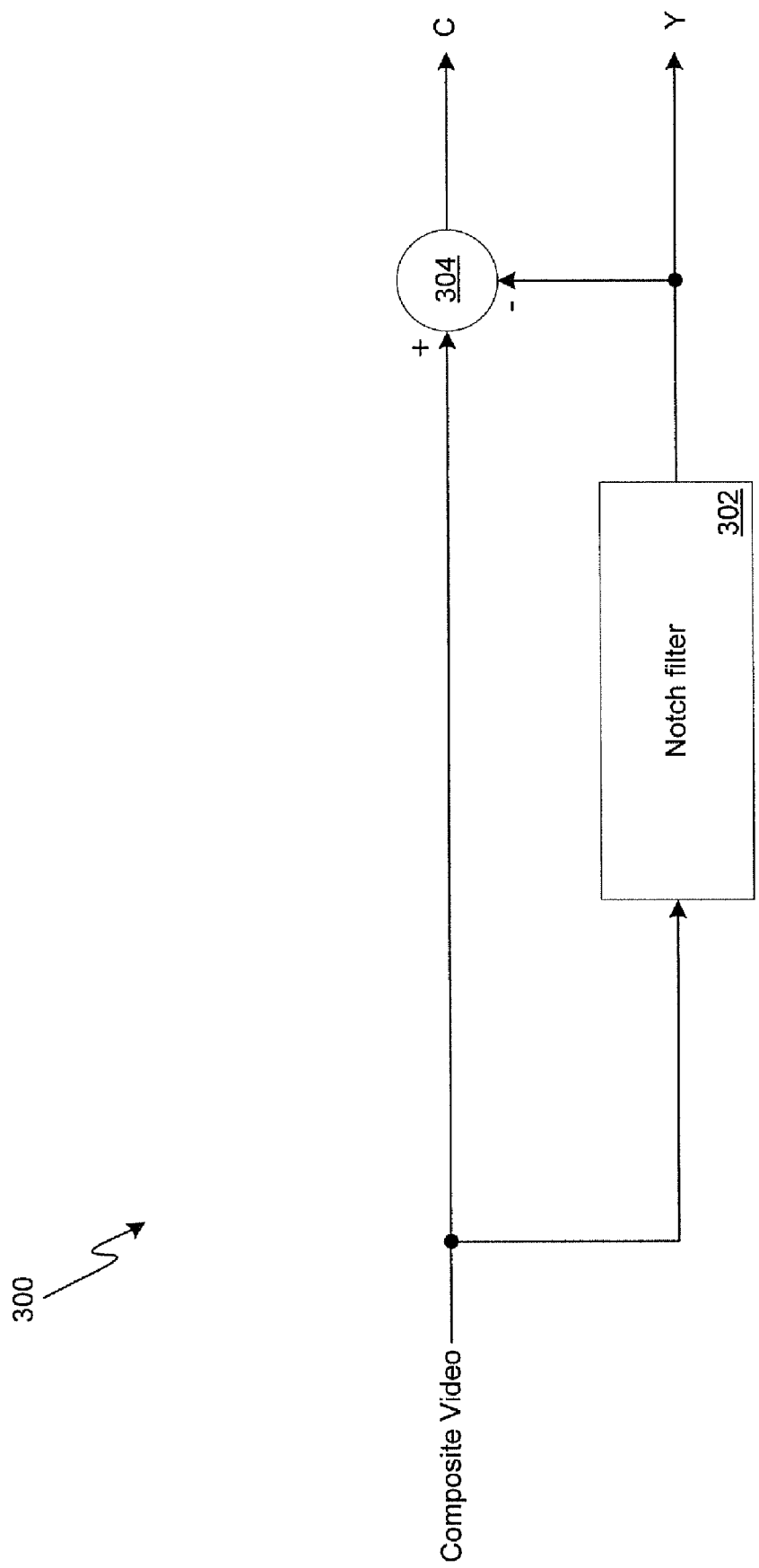
FIG. 3 is a block diagram of an exemplary notch filter mode for Y/C separation operations, in accordance with an embodiment of the invention.

FIG. 3 is a block diagram of an exemplary notch filter mode for Y/C separation operations, in accordance with an embodiment of the invention. Referring to FIG. 3, there is shown an exemplary notch filter mode 300. The notch filter mode 300 may comprise a notch filter 302 and a summer 304.

The notch filter 302 may comprise suitable logic, circuitry, interfaces, and/or code that may be operable to receive a composite video baseband signal and allow a plurality of frequencies to pass through, but attenuate one or frequencies in a specific range to low levels. For example, for the NTSC standard, the notch filter 302 may be operable to attenuate frequencies in the range 3.58+/−1.3 MHz, and for the PAL standard, the notch filter 302 may be operable to attenuate frequencies in the range 4.43+/−1.3 MHz. Accordingly, the notch filter 302 may be operable to generate the luma component (Y_1D) of the composite video baseband signal. The summer 304 may comprise suitable logic, circuitry, interfaces, and/or code that may be operable to subtract the generated luma component (Y_1D) from the composite video baseband signal to generate the chroma component (C_1D) of the composite video baseband signal. Notwithstanding, the invention may not be so limited and other notch filters may be utilized without limiting the scope of the invention.

Figure 4A:
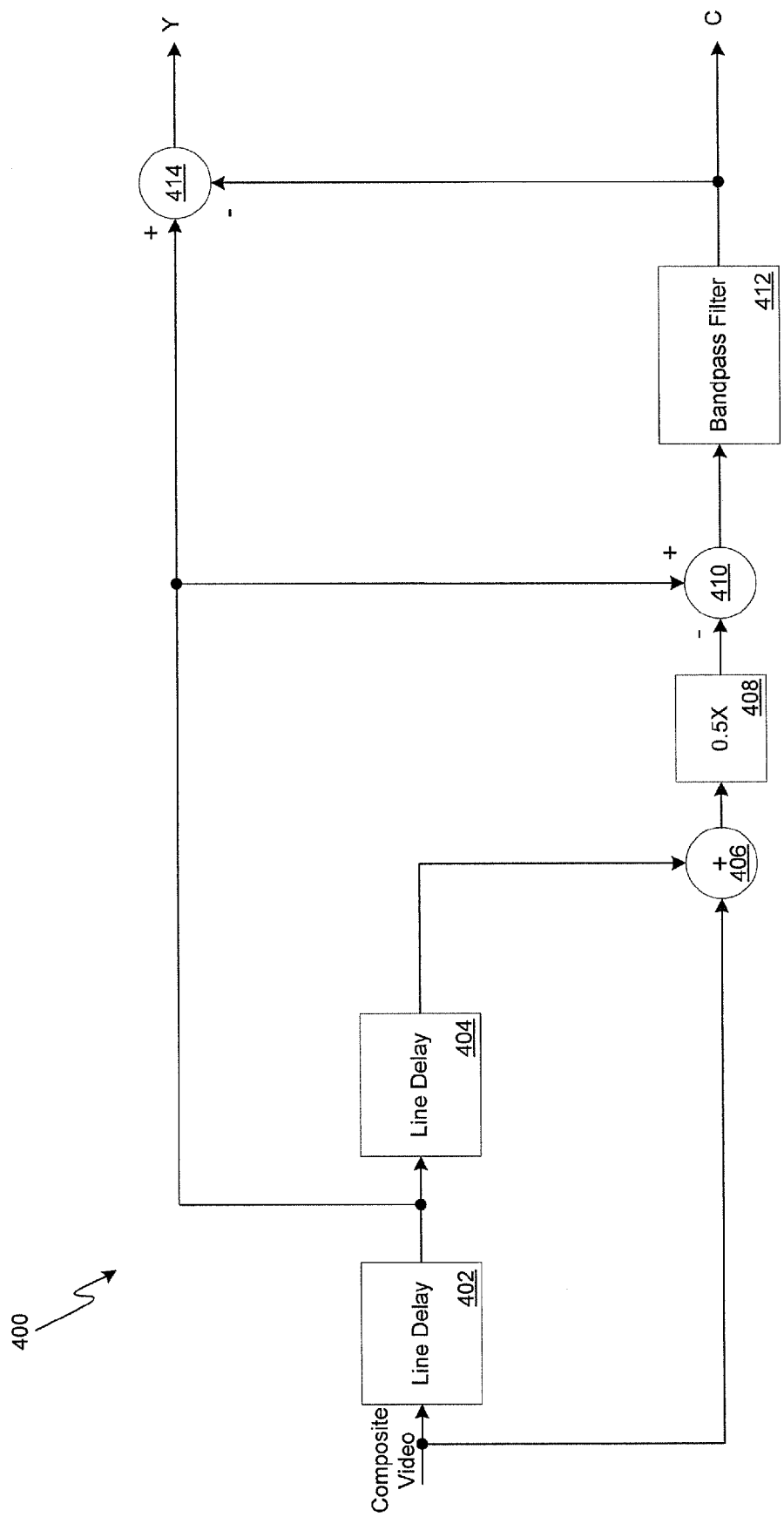
FIG. 4A is a block diagram of an exemplary spatial comb filter mode for Y/C separation operations, in accordance with an embodiment of the invention.

FIG. 4A is a block diagram of an exemplary spatial comb filter mode for Y/C separation operations, in accordance with an embodiment of the invention. Referring to FIG. 4A, there is shown an exemplary spatial comb filter mode 400. The spatial comb filter mode 400 may comprise a plurality of line delays 402 and 404, a plurality of summers 406, 10, and 414, a divider 408 and a bandpass filter 412.

The bandpass filter 412 may comprise suitable logic, circuitry, interfaces, and/or code that may be operable to allow a specific set of frequencies and attenuate a remaining set of frequencies. The plurality of line delays 402 and 404 may comprise suitable logic, circuitry, interfaces, and/or code that may be operable to delay a sample of the received composite video baseband signal by a time period.

In operation, the composite video baseband signal may be input to a first line delay 402 and a summer 406. The output of first line delay 402 may pass to a second line delay 404 and the summers 410 and 414. The output of the second line delay 404 may pass to the input of the summer 406. The summer 406 may be operable to generate a double-amplitude composite video baseband signal since the subcarriers are in-phase. A divider 408 (i.e., 0.5 multiplier) may be used to normalize the signal, which may be then input to the negative input of summer 410. Since a 180° phase difference exists between the output of summer 406 and the one line-delayed composite video signal, most of the luminance may be canceled by the invert adder 410, leaving the chrominance. The output of the summer 410 may be input to the bandpass filter 412. The bandpass filter 412 may be operable to generate the chroma component of the composite video baseband signal. The summer 414 may be operable to receive the line delayed composite video baseband signal and subtract the generated chroma component of the composite video baseband signal to generate the luma component of the composite video baseband signal. Notwithstanding, the invention may not be so limited and other architectures may be utilized for spatial comb filtering operations without limiting the scope of the invention.

Figure 4B:
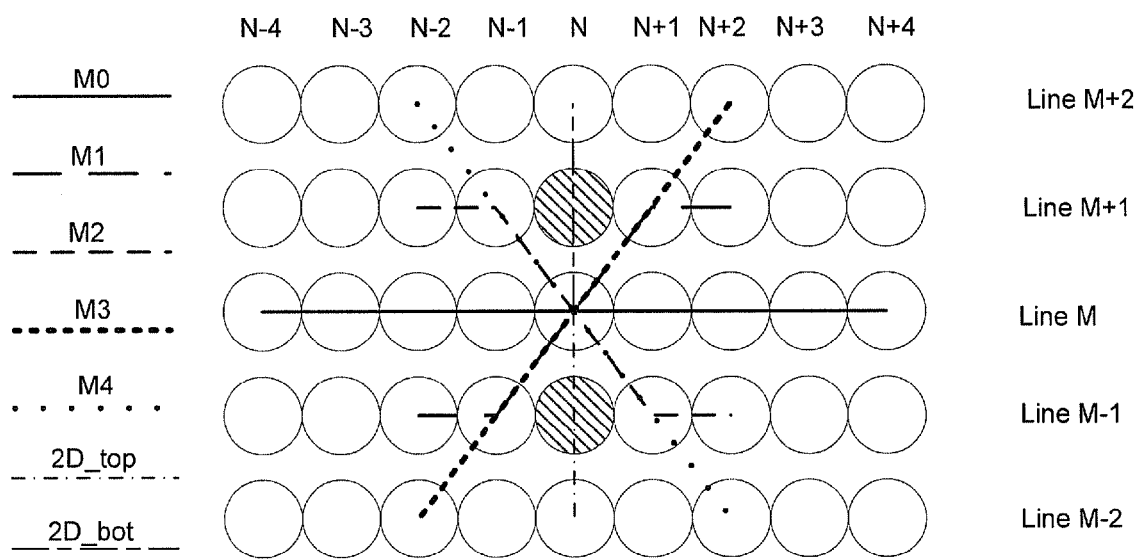
FIG. 4B is a diagram of an exemplary embodiment of a generalized spatial comb mode sample plane for NTSC standard, in accordance with an embodiment of the invention.

FIG. 4B is a diagram of an exemplary embodiment of a generalized spatial comb mode sample plane for NTSC standard, in accordance with an embodiment of the invention. Referring to FIG. 4B, there is shown a plurality of lines (M−2, M−1, M, M+1, and M+2) of composite video baseband signal samples in spatial domain for the NTSC standard at different time periods (N−4, N−3, N−2, N−1, N, N+1, N+2, N+3, and N+4).

In accordance with an embodiment of the invention, the luma component (Y) and the chroma component (C) of a sample, S(M, N) may be generated. A plurality of sets of samples, for example, $M_0$, $M_1$, $M_2$, $M_3$, $M_4$, 2D_top and 2D_bot may be defined For example, set $M_0$ may comprise the set of samples [(M, N−4), (M, N−3), (M, N−2), (M, N−1), (M, N), (M, N+1), (M, N+2), (M, N+3) and (M, N+4)]. Similarly, set $M_1$ may comprise the set of samples [(M−1, N−2), (M−1, N−1), (M, N), (M+1, N+1), (M+1, N+2)]. The set $M_2$ may comprise the set of samples [(M+1, N−2), (M+1, N−1), (M, N), (M−1, N+1), (M−1, N+2)]. The set $M_3$ may comprise the set of samples [(M−2, N−2), (M−1, N−1), (M, N), (M+1, N+1), (M+2, N+2)]. The set $M_4$ may comprise the set of samples [(M+2, N−2), (M+1, N−1), (M, N), (M−1, N+1), (M−2, N+2)]. The set 2D_top may comprise the set of samples [(M+2, N), (M+1, N), (M, N)]. The set 2D_bot may comprise the set of samples [(M−2, N), (M−1, N), (M, N)].

Figure 4C:
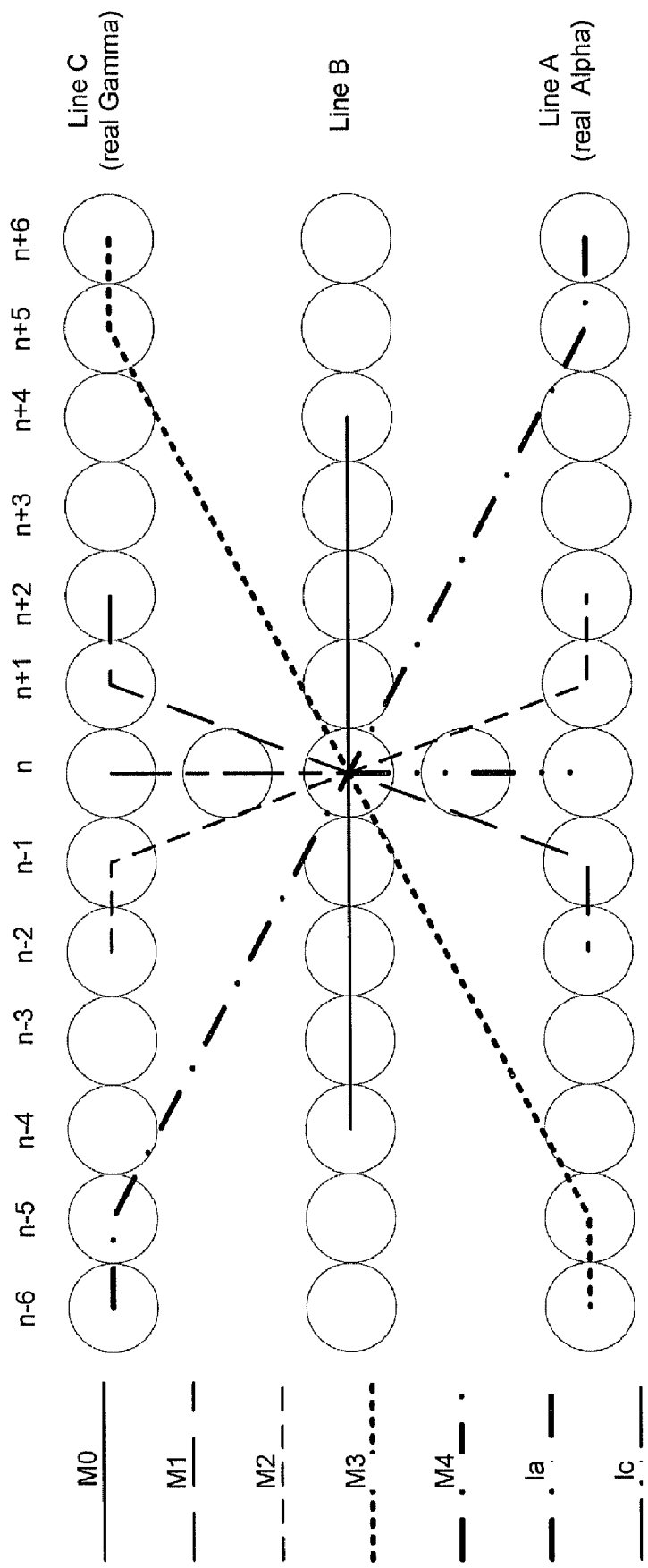
FIG. 4C is a diagram of an exemplary embodiment of a generalized spatial comb mode sample plane for PAL standard, in accordance with an embodiment of the invention.

FIG. 4C is a diagram of an exemplary embodiment of a generalized spatial comb mode sample plane for PAL standard, in accordance with an embodiment of the invention. Referring to FIG. 4C, there is shown a plurality of lines (A, B and C) of composite video baseband signal samples in spatial domain for the PAL standard at different time periods (N−6, N−5, N−4, N−3, N−2, N−1, N, N+1, N+2, N+3, N+4, N+5 and N+6).

In accordance with an embodiment of the invention, the luma component (Y) and the chroma component (C) of a sample, S(B, N) may be generated. A plurality of sets of samples, for example, $M_0$, $M_1$, $M_2$, $M_3$, $M_4$, Ia and Ib may be defined. For example, set $M_0$ may comprise the set of samples [(B, N−4), (B, N−3), (B, N−2), (B, N−1), (B, N), (B, N+1), (B, N+2), (B, N+3) and (B, N+4)]. Similarly, set $M_1$ may comprise the set of samples [(A, N−2), (A, N−1), (B, N), (C, N+1), (C, N+2)]. The set $M_2$ may comprise the set of samples [(C, N−2), (C, N−1), (B, N), (A, N+1), (A, N+2)]. The set $M_3$ may comprise the set of samples [(A, N−6), (A, N−5), (B, N), (C, N+5), (C, N+6)]. The set $M_4$ may comprise the set of samples [(C, N−6), (C, N−5), (B, N), (A, N+5), (A, N+6)]. The set Ia may comprise the set of samples [(A, N), (B, N)]. The set Ic may comprise the set of samples [(C, N), (B, N)].

Figure 5A:
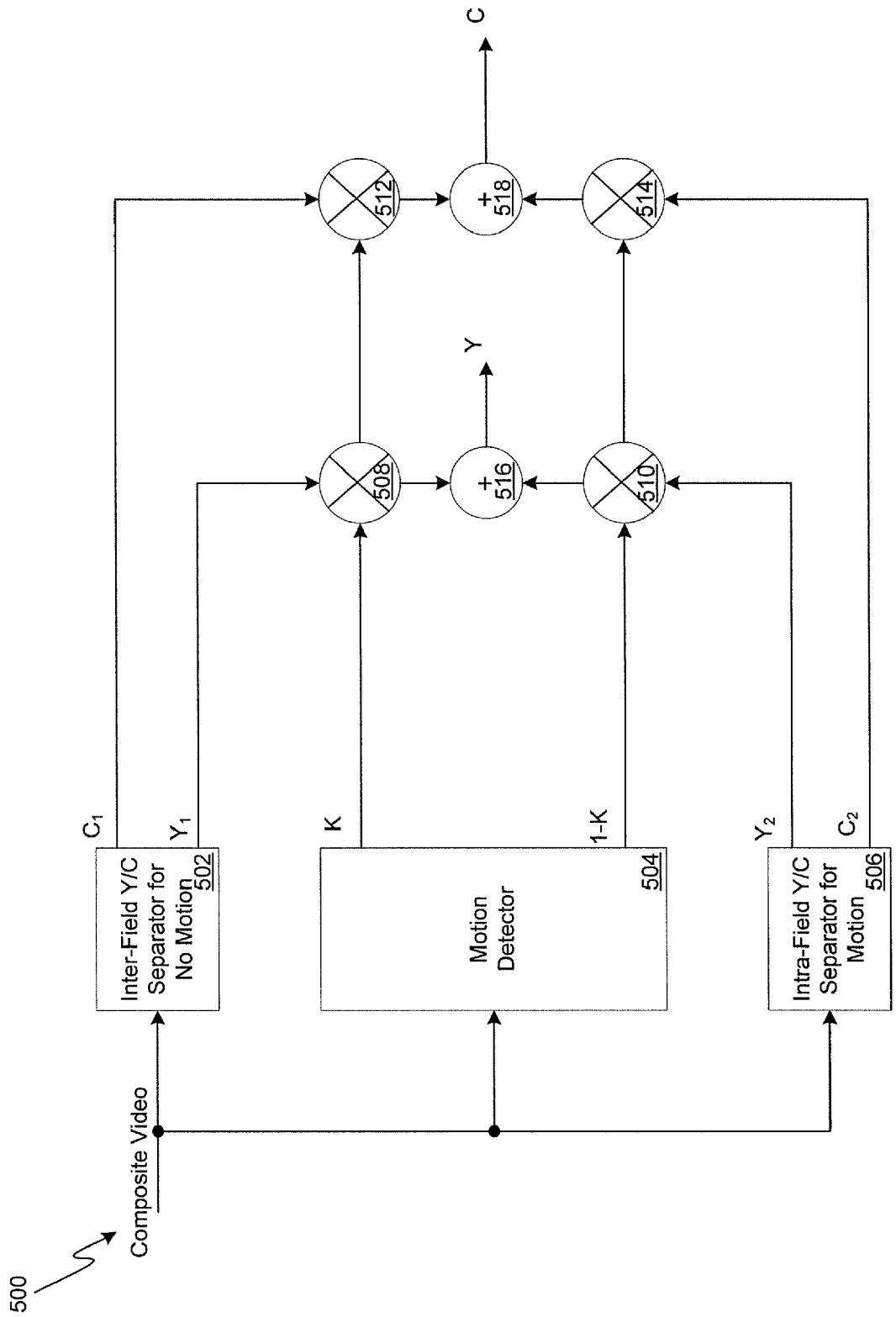
FIG. 5A is a block diagram of an exemplary 3D motion adaptive temporal comb filter for Y/C separation operations, in accordance with an embodiment of the invention.

FIG. 5A is a block diagram of an exemplary 3D motion adaptive temporal comb filter for Y/C separation operations, in accordance with an embodiment of the invention. Referring to FIG. 5A, there is shown an exemplary temporal 3D comb filter mode 500. The temporal 3D comb filter mode 500 may comprise an inter-field Y/C separator 502, a motion detector 504, an inter-field Y/C separator 506, a plurality of multipliers 508, 510, 512, and 514, and a plurality of summers 516 and 518.

The inter-field Y/C separator 502 may comprise suitable logic, circuitry, interfaces, and/or code that may be operable to receive a composite video baseband signal and perform 3D comb filtering operations for Y/C separation for still areas, or for video signals without motion, for example. The inter-field Y/C separator 502 may be operable to receive the composite video baseband signal and generate the luma component $Y_1$ and the chroma component $C_1$ of the composite video baseband signal. The intra-field Y/C separator 506 may comprise suitable logic, circuitry, interfaces, and/or code that may be operable to receive a composite video baseband signal and perform 2D comb filtering operations for Y/C separation for areas of the picture that may contain motion, or for video signals with motion, for example. The intra-field Y/C separator 506 may be operable to receive the composite video baseband signal and generate the luma component $Y_2$ and the chroma component $C_2$ of the composite video baseband signal.

The motion detector 504 may comprise suitable logic, circuitry, interfaces, and/or code that may be operable to receive a composite video baseband signal and generate a motion signal value (K), where K is in the range [0-1]. The motion detector 504 may be operable to allow the luminance and chrominance signals from the inter-field Y/C separator 502 and the inter-field Y/C separator 506 to be proportionally mixed.

The multiplier 508 may comprise suitable logic, circuitry, interfaces, and/or code that may be operable to receive as inputs, the luma component $Y_1$ and the motion signal value K and generate an output $KY_1$ to the multiplier 512 and the summer 516. The multiplier 512 may comprise suitable logic, circuitry, interfaces, and/or code that may be operable to receive as inputs, the chroma component $C_1$ and the output of the multiplier 508, $KY_1$ and generate an output $KY_1C_1$ to the summer 518.

The multiplier 510 may comprise suitable logic, circuitry, interfaces, and/or code that may be operable to receive as inputs, the luma component $Y_2$ and the motion signal value $(1-K)$ and generate an output $(1-K)Y_2$ to the multiplier 514 and the summer 516. The multiplier 514 may comprise suitable logic, circuitry, interfaces, and/or code that may be operable to receive as inputs, the chroma component $C_2$ and the output of the multiplier 510, $(1-K)Y_2$ and generate an output $(1-K)Y_2C_2$ to the summer 518.

The summer 516 may comprise suitable logic, circuitry, interfaces, and/or code that may be operable to receive as inputs, the output of the multiplier 508, $KY_1$ and the output of the multiplier 510, $(1-K)Y_2$ to generate the luma component Y of the composite video baseband signal.

The summer 518 may comprise suitable logic, circuitry, interfaces, and/or code that may be operable to receive as inputs, the output of the multiplier 512, $KY_1C_1$ and the output of the multiplier 514, $(1-K)Y_2C_2$ to generate the chroma component C of the composite video baseband signal.

Figure 5B:
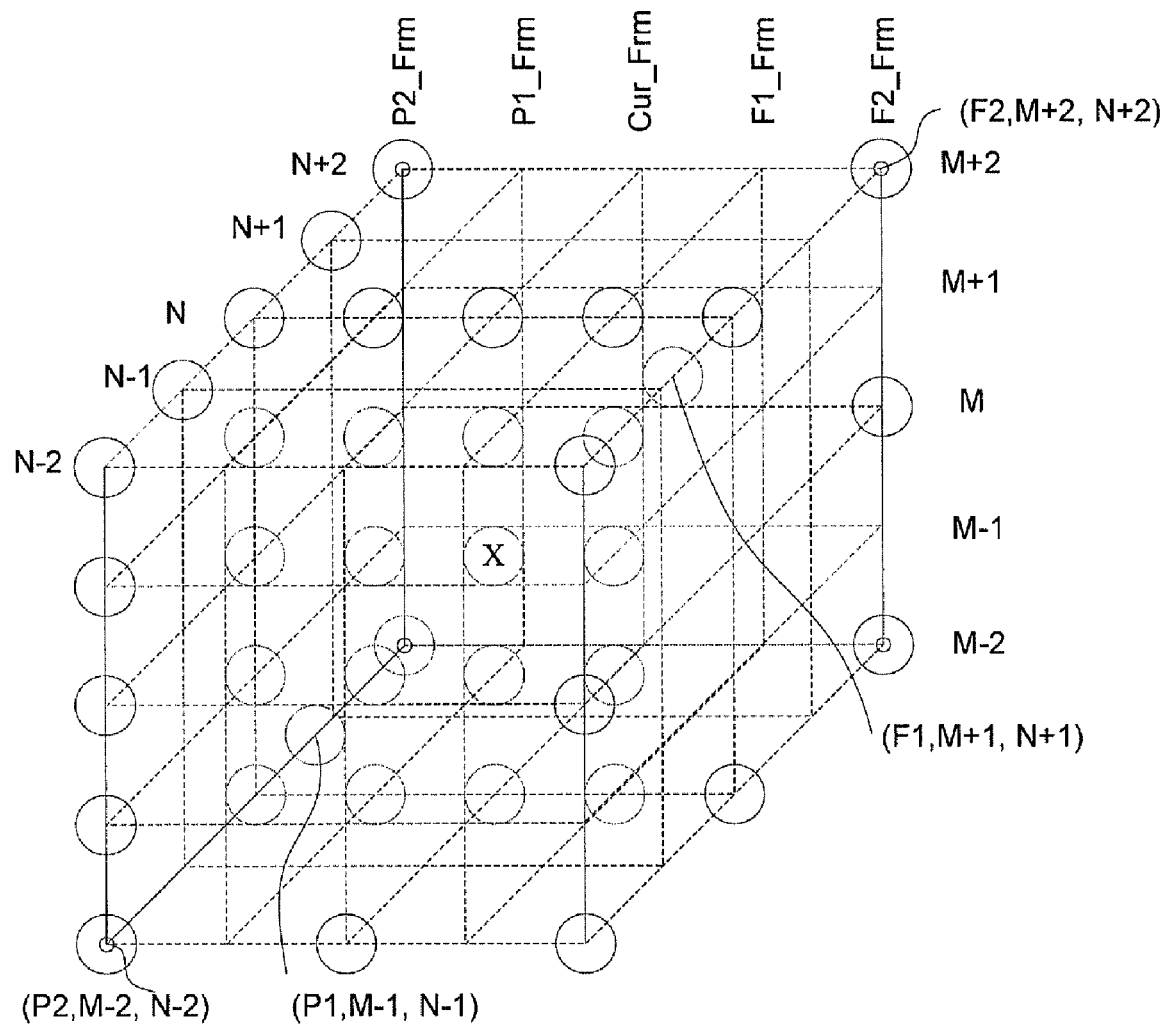
FIG. 5B is a diagram of an exemplary embodiment of a generalized temporal comb mode sample plane, in accordance with an embodiment of the invention.

FIG. 5B is a diagram of an exemplary embodiment of a generalized temporal comb mode sample plane, in accordance with an embodiment of the invention. Referring to FIG. 5B, there is shown a plurality of frames (P2, P1, Cur, F1, F2), a plurality of lines (M−2, M−1, M, M+1, and M+2) of composite video baseband signal samples in temporal domain at different time periods (N−2, N−1, N, N+1, N+2).

In accordance with an embodiment of the invention, the luma component (Y) and the chroma component (C) of a sample, S(Cur, M, N) may be generated. A set of samples, for example, $3D\_M_1$ may be defined. For example, set $3D\_M_1$ may comprise the set of samples [(P2, M−2, N−2), (P1, M−1, N−1), (Cur, M, N), (F1, M+1, N+1), and (F2, M+2, N+2)].

Figure 6:
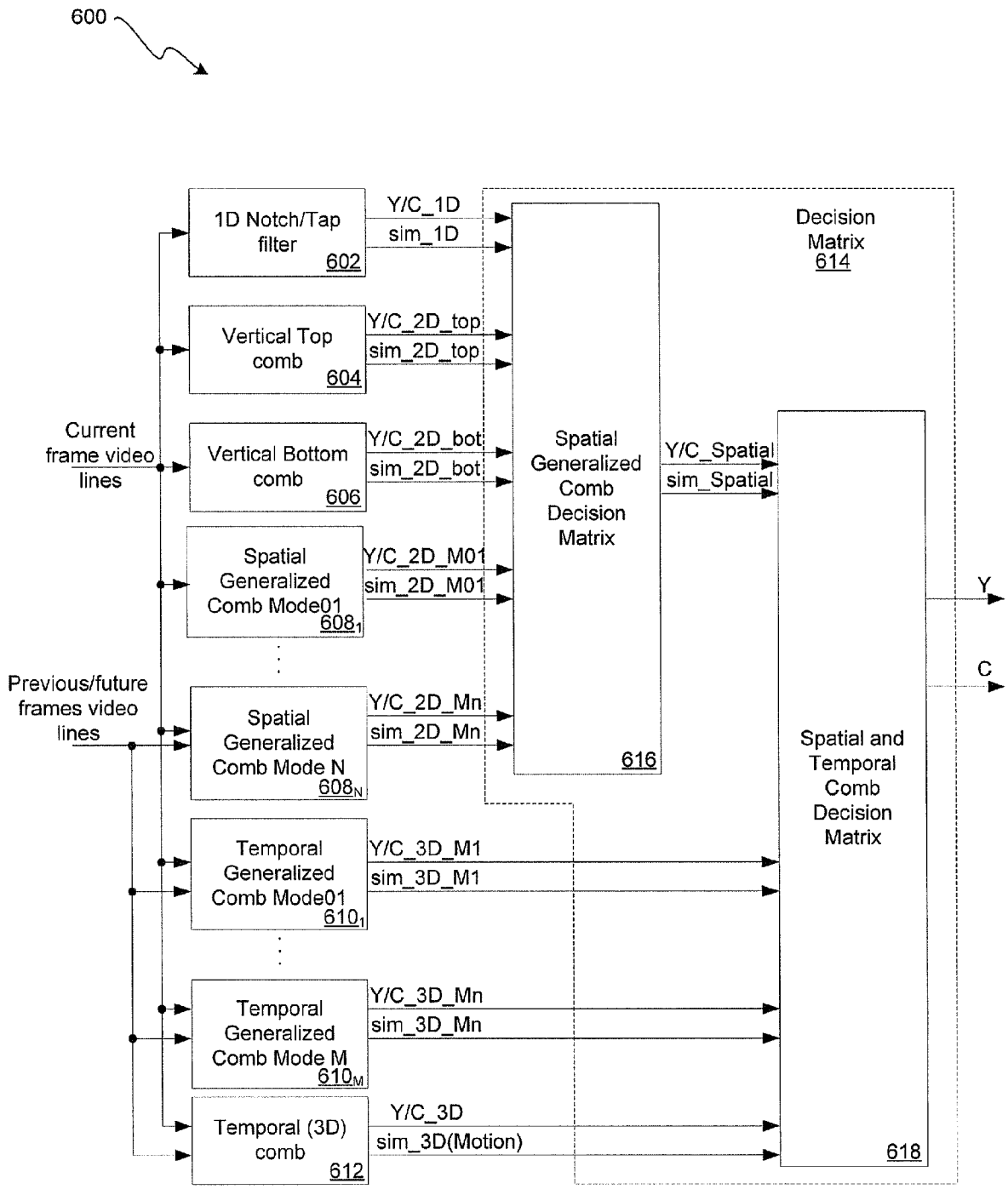
FIG. 6 is a block diagram of an exemplary generalized multi-dimensional filter device for Y/C separation operations, in accordance with an embodiment of the invention.

FIG. 6 is a block diagram of an exemplary generalized multi-dimensional filter device for Y/C separation operations, in accordance with an embodiment of the invention. Referring to FIG. 6, there is shown an exemplary video decoder 600. The video decoder 600 may comprise a notch filter mode 602, a vertical top comb filter mode 604, a vertical bottom comb filter mode 606, spatial generalized comb filter modes $608_{1...N}$, temporal generalized comb filter modes $610_{1...M}$, a temporal 3D comb filter mode 612, and a decision matrix 614. The decision matrix 614 may comprise a spatial generalized comb decision matrix 616 and a spatial and temporal comb decision matrix 618.

The notch filter mode 602 may comprise suitable logic, circuitry, interfaces, and/or code that may be operable to receive samples of current frame video lines of a composite video baseband signal and generate a corresponding luma component (Y_1D) and a corresponding chroma component (C_1D) of a sample S(M, N) of the composite video baseband signal and a similarity level (sim_1D) of the sample S(M, N) of the composite video baseband signal. The notch filter mode 602 may be similar to notch filter mode 300 and substantially as described in FIG. 3. For example, in accordance with an embodiment of the invention, the notch filter mode 602 may be operable to generate a corresponding luma component (Y_1D) and a corresponding chroma component (C_1D) of a sample S(M, N) of the composite video baseband signal along the set of samples, M0.

The vertical top comb filter mode 604 may comprise suitable logic, circuitry, interfaces, and/or code that may be operable to receive samples of current frame video lines of a composite video baseband signal and utilize the set of samples, set 2D_top that comprises [(M+2, N), (M+1, N), (M, N)] to generate a corresponding luma component (Y_2D_top) and a corresponding chroma component (C_2D_top) of a sample S(M, N) of the composite video baseband signal and a similarity level (sim_2D_top) of the sample S(M, N) of the composite video baseband signal. The vertical top comb filter mode 604 may be similar to spatial comb filter mode 400 and substantially as described in FIG. 4A. For example, in accordance with an embodiment of the invention, the vertical top comb filter mode 604 may be operable to generate a corresponding luma component (Y_2D_top) and a corresponding chroma component (C_2D_top) of a sample S(M, N) of the composite video baseband signal according to the following equations:

For the NTSC standard, $Y\_2D\_top=(S(M,N)+S(M+1,N))/2$

For the NTSC standard, $C\_2D\_top=(S(M,N)-S(M+1,N))/2$

For the PAL standard, $Y\_2D\_top=(S(M,N)+S(M+2,N))/2$

For the PAL standard, $C\_2D\_top=(S(M,N)-S(M+2,N))/2$

The vertical bottom comb filter mode 606 may comprise suitable logic, circuitry, interfaces, and/or code that may be operable to receive samples of current frame video lines of a composite video baseband signal and utilize the set of samples, set 2D_bot that comprises [(M−2, N), (M−1, N), (M, N)] to generate a corresponding luma component (Y_2D_bot) and a corresponding chroma component (C_2D_bot) of a sample S(M, N) of the composite video baseband signal and a similarity level (sim__2D_bot) of the sample S(M, N) of the composite video baseband signal. The vertical bottom comb filter mode 606 may be similar to spatial comb filter mode 400 and substantially as described in FIG. 4A. For example, in accordance with an embodiment of the invention, the vertical bottom comb filter mode 606 may be operable to generate a corresponding luma component (Y__2D_bot) and a corresponding chroma component (C__2D_bot) of a sample S(M, N) of the composite video baseband signal according to the following equations:

For the NTSC standard, $Y\_2D\_bot = (S(M,N) + S(M-1, N))/2$

For the NTSC standard, $C\_2D\_bot = (S(M,N) - S(M-1, N))/2$

For the PAL standard, $Y\_2D\_bot = (S(M,N) + S(M-2, N))/2$

For the PAL standard, $C\_2D\_bot = (S(M,N) - S(M-2, N))/2$

The spatial generalized comb filter modes $608_{1 \ldots N}$ may comprise suitable logic, circuitry, interfaces, and/or code that may be operable to receive samples of previous, current and future frames of video lines of a composite video baseband signal and utilize the sets of samples, $M_0, M_1, M_2, M_3, M_4$, to generate corresponding luma components ($Y\_2D\_M_{1 \ldots N}$) and corresponding chroma components ($C\_2D\_M_{1 \ldots N}$) of a sample S(M, N) of the composite video baseband signal and similarity levels ($sim\_2D\_M_{1 \ldots N}$) of the sample S(M, N) of the composite video baseband signal. The spatial generalized comb filter modes $608_{1 \ldots N}$ may be similar to spatial comb filter mode 400 and substantially as described in FIG. 4A.

In accordance with an embodiment of the invention, based on the set of samples $M_1$ for the NTSC standard, which comprises the samples [(M−1, N−2), (M−1, N−1), (M, N), (M+1, N+1), (M+1, N+2)], the corresponding luma component $Y\_2D\_M_1$ and the corresponding chroma component $C\_2D\_M_1$ and the similarity level ($sim\_2D\_M_1$) of the sample S(M, N) of the composite video baseband signal may be generated according to the following equations:

$$\begin{bmatrix} Y\_2D\_M_1 \\ C\_2D\_M_1 \end{bmatrix} = (A' * A)^{-1} * A' * \begin{bmatrix} B \\ K1 \\ K2 \end{bmatrix}$$

$$(A' * A)^{-1} * A' = \begin{bmatrix} f_{11} & f_{12} & f_{13} \\ f_{21} & f_{22} & f_{23} \end{bmatrix} = MK_{2 \times 3}$$

$$sim\_2D\_M_1 = \left\{ \begin{array}{l} |S(M,N) - (\hat{Y} + \hat{C})| + \\ |K1 - \hat{Y} - \hat{C} * \cos(pi + x)| + \\ |K2 - \hat{Y} - \hat{C} * \cos(pi + 2x)| \end{array} \right\}_{LPF}$$

where $$A = \begin{bmatrix} 1 & 1 \\ 1 & \cos(pi + x) \\ 1 & \cos(pi + 2i) \end{bmatrix};$$

$K1 = \{S(M-1,N-1) + S(M+1,N+1)\}/2 = Y\_2D\_M_1 + C\_2D\_M_1 * \cos(180 + x);$ $K2 = \{S(M-1,N-2) + S(M+1,N+2)\}/2 = Y\_2D\_M_1 + C\_2D\_M_1 * \cos(180 + 2x),$ x is the phase difference between horizontally nearby samples, for example, the phase difference between samples S(M, N) and S(M, N+1) and the value of x may depend on the standard type, for example, NTSC or PAL and the sampling rate, B is the current set of samples of the current line M, and $f_{11}, f_{12}, f_{13}, f_{21}, f_{22}$, and $f_{23}$ are programmable parameters.

In accordance with another embodiment of the invention, the corresponding luma component $Y\_2D\_M_1$ and the corresponding chroma component $C\_2D\_M_1$ and the similarity level ($sim\_2D\_M_1$) of the sample S(M, N) of the composite video baseband signal may be generated according to the following equations:

$C\_2D\_M_1 = (S(M,N) - K1)/(1 + \cos x)$ $Y\_2D\_M_1 = S(M,N) - C\_2D\_M_1$ $sim\_2D\_M_1 = (|S(M,N) - (K1 + (K2-K1)*(1+\cos x)/(\cos(x) - \cos(2x)))|)_{LPF}$ The temporal generalized comb filter modes $610_{1 \ldots M}$ may comprise suitable logic, circuitry, interfaces, and/or code that may be operable to receive samples of previous, current and future frames of video lines of a composite video baseband signal and utilize a set of samples, for example, $3D\_M_1$ to generate corresponding luma components ($Y\_3D\_M_{1 \ldots N}$) and corresponding chroma components ($C\_3D\_M_{1 \ldots N}$) of a sample S(M, N) of the composite video baseband signal and similarity levels ($sim\_3D\_M_{1 \ldots N}$) of the sample S(M, N) of the composite video baseband signal. The temporal generalized comb filter modes $610_{1 \ldots M}$ may be similar to the temporal 3D comb filter mode 500 and substantially as described in FIG. 5A.

In accordance with an embodiment of the invention, based on the set of samples $3D\_M_1$, which comprises the samples [(P2, M−2, N−2), (P1, M−1, N−1), (Cur, M, N), (F1, M+1, N+1), and (F2, M+2, N+2)], the corresponding luma component $Y\_3D\_M_1$ and the corresponding chroma component $C\_3D\_M_1$ and the similarity level ($sim\_3D\_M_1$) of the sample S(Cur, M, N) of the composite video baseband signal may be generated according to the following equations:

$$\begin{bmatrix} Y\_3D\_M_1 \\ C\_3D\_M_1 \end{bmatrix} = (A' * A)^{-1} * A' * \begin{bmatrix} B \\ K1 \\ K2 \end{bmatrix}$$

$$sim\_3D\_M_1 = \left\{ \begin{array}{l} |S(Cur, M, N) - (Y\_3D\_M_1 + C\_3D\_M_1)| + \\ |K1 - Y\_3D\_M_1 - C\_3D\_M_1 * \cos(pi + x)| + \\ |K2 - Y\_3D\_M_1 - C\_3D\_M_1 * \cos(pi + 2x)| \end{array} \right\}_{LPF}$$

where $$A + \begin{bmatrix} 1 & 1 \\ 1 & \cos(pi + x) \\ 1 & \cos(pi + 2x) \end{bmatrix};$$

$K1 = \{S(P1,M-1,N-1) + S(F1,M+1,N+1)\}/2 = Y\_3D\_M_1 + C\_3D\_M_1 * \cos(180 + x)$ $K2 = \{S(P2,M-2,N-2) + S(F2,M+2,N+2)\}/2 = Y\_3D\_M_1 + C\_3D\_M_1 * \cos(2x)$ In accordance with another embodiment of the invention, the corresponding luma component $Y\_3D\_M_1$ and the corresponding chroma component $C\_3D\_M_1$ and the similarity level ($sim\_3D\_M_1$) of the sample S(Cur, M, N) of the composite video baseband signal may be generated according to the following equations:

$C\_3D\_M_1 = (S(Cur,M,N) - K1)/(1 + \cos x)$ $Y\_3D\_M_1 = S(Cur,M,N) - C\_3D\_M_1$ $sim\_3D\_M_1 = (|S(Cur,M,N) - (K1 + (K2-K1)*(1+\cos(x)/(\cos(x) - \cos(2x)))|)_{LPF}$.

The temporal 3D comb filter mode 612 may comprise suitable logic, circuitry, interfaces, and/or code that may be operable to receive samples of previous, current and future frames of video lines of a composite video baseband signal and utilize a set of samples, 3D_M1 that comprises [(P2, M−2, N−2), (P1, M−1, N−1), (Cur, M, N), (F1, M+1, N+1), and (F2, M+2, N+2)] to generate a corresponding luma component (Y_3D) and a corresponding chroma component (C_3D) of a sample S(M, N) of the composite video baseband signal and a similarity level (sim_3D) of the sample S(M, N) of the composite video baseband signal. The temporal 3D comb filter mode 612 may be similar to temporal 3D comb filter mode 500 and substantially as described in FIG. 5A. For example, in accordance with an embodiment of the invention, the temporal 3D comb filter mode 612 may be operable to generate a corresponding luma component (Y_3D) and a corresponding chroma component (C_3D) of a sample S(M, N) of the composite video baseband signal according to the following equations:

For the NTSC standard, $Y\_3D = ((Cur,M,N)+(F1,M,N))/2$ or $((Cur,M,N)+(P1,M,N))/2$ For the NTSC standard, $C\_3D = ((Cur,M,N)-(F1,M,N))/2$ or $((Cur,M,N)-(P1,M,N))/2$ For the PAL standard, $Y\_3D = ((Cur,M,N)+(F2,M,N))/2$ or $((Cur,M,N)+(P2,M,N))/2$ For the PAL standard, $C\_3D = ((Cur,M,N)-(F2,M,N))/2$ or $((Cur,M,N)-(P2,M,N))/2$ The spatial generalized comb decision matrix 616 may comprise suitable logic, circuitry, interfaces, and/or code that may be operable to receive the corresponding luma components, for example, Y_1D, Y_2D_top, Y_2D_bot, and $Y\_2D\_M_{1...N}$, and the corresponding chroma components, for example, C_1D, C_2D_top, C_2D_bot, and $C\_2D\_M_{1...N}$, for each of the plurality of spatial filtering modes, for example, notch filter mode 602, vertical top comb filter mode 604, vertical bottom comb filter mode 606, spatial generalized comb filter modes $608_{1...N}$, and the similarity levels of the sample S(M, N) corresponding to each of the one or more spatial filtering modes, for example, sim_1D, sim_2D_top, sim_2D_bot, $sim\_2D\_M_{1...N}$. The spatial generalized comb decision matrix 616 may be operable to generate a spatial luma component (Y_spatial) and a spatial chroma component (C_spatial) and a spatial similarity level (sim_spatial) of the sample S(M, N) of the composite video baseband signal.

The spatial and temporal comb decision matrix 618 may comprise suitable logic, circuitry, interfaces, and/or code that may be operable to receive the corresponding luma components, for example, $Y\_3D\_M_{1...M}$ and Y_3D and the corresponding chroma components, for example, $C\_3D\_M_{1...M}$ and C_3D for each of the one or more temporal filtering modes, for example, temporal generalized comb filter modes $610_{1...M}$ and temporal 3D comb filter mode 612, the generated spatial luma component (Y_spatial) and the generated spatial chroma component (C_spatial) of the sample S(M, N) of the composite video baseband signal. The spatial and temporal comb decision matrix 618 may be operable to receive the similarity levels of the sample S(M, N) corresponding to each of the one or more temporal filtering modes, for example, $sim\_3D\_M_{1...M}$ and sim_3D and the spatial similarity level (sim_spatial) of the sample S(M, N) of the composite video baseband signal. The spatial and temporal comb decision matrix 618 may be operable to generate a luma component (Y) and a chroma component (C) of the sample S(M, N) of the composite video baseband signal.

Figure 7A:
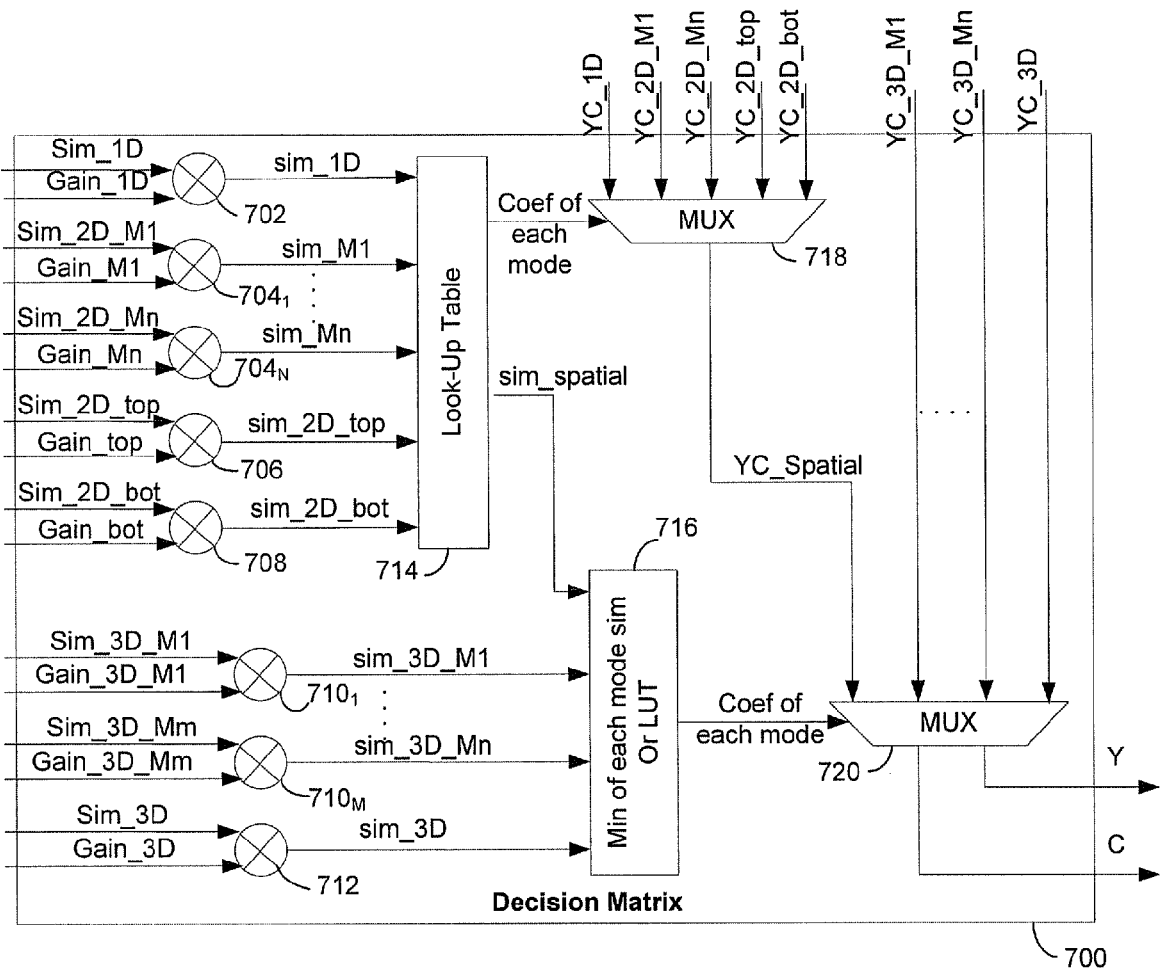
FIG. 7A is a block diagram of an exemplary decision matrix for Y/C separation operations, in accordance with an embodiment of the invention.

FIG. 7A is a block diagram of an exemplary decision matrix for Y/C separation operations, in accordance with an embodiment of the invention. Referring to FIG. 7A, there is shown an exemplary decision matrix 700. The decision matrix 700 may comprise a plurality of multipliers 702, $704_{1...N}$, 706, 708, $710_{1...M}$, and 712, a plurality of look-up tables 718 and 720, and a plurality of multiplexers 722 and 724.

The multiplier 702 may comprise suitable logic, circuitry, interfaces, and/or code that may be operable to receive as inputs, a similarity level (sim_1D) of a sample S(M, N) of the composite video baseband signal and a gain value (gain_1D) to modify the sensitivity of the notch filter mode 602 and generate a normalized similarity level (sim_1D) of a sample S(M, N) of the composite video baseband signal.

The multipliers $704_{1...N}$ may comprise suitable logic, circuitry, interfaces, and/or code that may be operable to receive as inputs, similarity levels ($sim\_2D\_M_{1...N}$) of a sample S(M, N) of the composite video baseband signal and gain values ($gain\_M_{1...N}$) to modify the sensitivity of the spatial generalized comb filter modes $608_{1...N}$ and generate normalized similarity levels ($sim\_2D\_M_{1...N}$) of a sample S(M, N) of the composite video baseband signal.

The multiplier 706 may comprise suitable logic, circuitry, interfaces, and/or code that may be operable to receive as inputs, a similarity level (sim_2D_top) of a sample S(M, N) of the composite video baseband signal and a gain value (gain_top) to modify the sensitivity of the vertical top comb filter mode 604 and generate a normalized similarity level (sim_2D_top) of a sample S(M, N) of the composite video baseband signal.

The multiplier 708 may comprise suitable logic, circuitry, interfaces, and/or code that may be operable to receive as inputs, a similarity level (sim_2D_bot) of a sample S(M, N) of the composite video baseband signal and a gain value (gain_bot) to modify the sensitivity of the vertical bottom comb filter mode 606 and generate a normalized similarity level (sim_2D_bot) of a sample S(M, N) of the composite video baseband signal.

The multipliers $710_{1...M}$ may comprise suitable logic, circuitry, interfaces, and/or code that may be operable to receive as inputs, similarity levels ($sim\_3D\_M_{1...M}$) of a sample S(M, N) of the composite video baseband signal and gain values ($gain\_M_{1...M}$) to modify the sensitivity of the temporal generalized comb filter modes $610_{1...M}$ and generate normalized similarity levels ($sim\_3D\_M_{1...M}$) of a sample S(M, N) of the composite video baseband signal.

The multiplier 712 may comprise suitable logic, circuitry, interfaces, and/or code that may be operable to receive as inputs, a similarity level (sim_3D) of a sample S(M, N) of the composite video baseband signal and a gain value (gain_3D) to modify the sensitivity of the temporal 3D comb filter mode 612 and generate a normalized similarity level (sim_3D) of a sample S(M, N) of the composite video baseband signal.

The look-up table 714 may comprise information that may be stored in memory 106 and may receive as inputs, similarity levels of the sample S(M, N) corresponding to each of the one or more spatial filtering modes, for example, sim_1D, sim_2D_top, sim_2D_bot, sim_2D_M$_{1...N}$. The processor 104 may be operable to utilize the stored similarity levels in the look-up table 714 to generate a corresponding coefficient, for example, coef_1D, coef_2D_top, coef_2D_bot, and coef_2D_M$_{1...N}$, for each of the one or more spatial filtering modes based on the determined similarity levels, for example, sim_1D, sim_2D_top, sim_2D_bot, and sim_2D_M$_{1...N}$, corresponding to each of the one or more spatial filtering modes. For example, in accordance with an embodiment of the invention, the processor 104 may be operable utilize the stored similarity levels in the look-up table 714 to generate a corresponding coefficient, for example, coef_1D, coef_2D_top, coef_2D_bot, and coef_2D_M$_{1...N}$, for each of the one or more spatial filtering modes based on the minimum of the determined similarity levels, for example, sim_1D, sim_2D_top, sim_2D_bot, and sim_2D_M$_{1...N}$, corresponding to each of the one or more spatial filtering modes.

The look-up table 714 may be utilized to determine a spatial similarity level (sim_spatial) based on the determined similarity levels, for example, sim_1D, sim_2D_top, sim_2D_bot, sim_2D_M$_{1...N}$, corresponding to each of the one or more spatial filtering modes, for example, notch filter mode 602, vertical top comb filter mode 604, vertical bottom comb filter mode 606, and spatial generalized comb filter modes 608$_{1...N}$. For example, in accordance with an embodiment of the invention, the look-up table 714 may be operable to determine a spatial similarity level (sim_spatial) based on the minimum of the determined similarity levels, for example, sim_1D, sim_2D_top, sim_2D_bot, sim_2D_M$_{1...N}$, corresponding to each of the one or more spatial filtering modes. For example, in accordance with another embodiment of the invention, the look-up table 714 may be operable to determine a spatial similarity level (sim_spatial) according to the following equation:

$$\text{sim\_spatial} = \begin{pmatrix} \sum_{i=1,...N} \text{sim\_M}_i * \text{coef\_2D\_M}_i + \\ \text{sim\_1D} * \text{coef\_1D} + \\ \text{sim\_2D\_top} * \text{coef\_2D\_top} + \\ \text{sim\_2D\_bot} * \text{coef\_2D\_bot} \end{pmatrix}$$

The look-up table 716 may comprise information that may be stored in memory 106 and may receive as inputs, similarity levels of the sample S(M, N) corresponding to each of the one or more temporal filtering modes, for example, sim_3D_M$_{1...M}$ and sim_3D, and the spatial similarity level (sim_spatial). The processor 104 may be operable utilize the stored similarity levels in the look-up table 716 to generate a corresponding coefficient, for example, coef_3D_M$_{1...M}$ and coef_3D for each of the one or more temporal filtering modes and the spatial coefficient (coef_spatial) based on the determined similarity levels, for example, sim_3D_M$_{1...M}$ and sim_3D, corresponding to each of the one or more temporal filtering modes and the spatial similarity level (sim_spatial). For example, in accordance with an embodiment of the invention, the processor 104 may be operable utilize the stored similarity levels in the look-up table 716 to generate a corresponding coefficient, for example, coef_3D_M$_{1...M}$ and coef_3D for each of the one or more temporal filtering modes and the spatial coefficient (coef_spatial) based on the minimum of the determined similarity levels, for example, sim_3D_M$_{1...M}$ and sim_3D, corresponding to each of the one or more temporal filtering modes and the spatial similarity level (sim_spatial).

The multiplexer 718 may comprise suitable logic, circuitry, interfaces, and/or code that may be operable to receive as inputs, the determined corresponding luma components, for example, Y_1D, Y_2D_top, Y_2D_bot, and Y_2D_M$_{1...N}$, and the determined corresponding chroma components, for example, C_1D, C_2D_top, C_2D_bot, and C_2D_M$_{1...N}$, for each of the one or more spatial filtering modes, for example, notch filter mode 602, vertical top comb filter mode 604, vertical bottom comb filter mode 606, spatial generalized comb filter modes 608$_{1...N}$. The multiplexer 718 may be enabled by one or more of the generated spatial filtering mode coefficients, for example, coef_1D, coef_2D_top, coef_2D_bot, coef_2D_M$_{1...N}$.

The multiplexer 718 may be operable to generate a spatial luma component (Y_spatial) and a spatial chroma component (C_spatial) of the sample S(M, N) of the composite video baseband signal based on selecting one of the determined corresponding luma components, for example, Y_1D, Y_2D_top, Y_2D_bot, and Y_2D_M$_{1...N}$, and the determined corresponding chroma components, for example, C_1D, C_2D_top, C_2D_bot, and C_2D_M$_{1...N}$, for each of the one or more spatial filtering modes corresponding to one of the generated one or more spatial filtering mode coefficients, for example, coef_1D, coef_2D_top, coef_2D_bot, coef_2D_M$_{1...N}$.

The multiplexer 720 may comprise suitable logic, circuitry, interfaces, and/or code that may be operable to receive as inputs, the determined corresponding luma components, for example, Y_3D_M$_{1...M}$ and Y_3D and the determined corresponding chroma components, for example, C_3D_M$_{1...M}$ and C_3D for each of the one or more temporal filtering modes and the generated spatial luma component (Y_spatial) and the generated spatial chroma component (C_spatial) of the sample S(M, N) of the composite video baseband signal. The multiplexer 720 may be enabled by one or more of the generated temporal filtering mode coefficients, for example, coef_3D_M$_{1...M}$ and coef_3D and the generated spatial coefficient (coef_spatial).

The multiplexer 720 may be operable to generate the luma component (Y) and the chroma component (C) of the sample S(Cur, M, N) of the composite video baseband signal based on selecting one of the determined corresponding luma components, for example, Y_3D_M$_{1...M}$ and Y_3D and the determined corresponding chroma components, for example, C_3D_M$_{1...M}$ and C_3D for each of the one or more temporal filtering modes and the generated spatial luma component (Y_spatial) and the generated spatial chroma component (C_spatial) of the sample S(M, N) of the composite video baseband signal corresponding to one of the generated one or more temporal filtering mode coefficients, for example, coef_3D_M$_{1...M}$ and coef_3D and the generated spatial coefficient (coef_spatial).

Figure 7B:
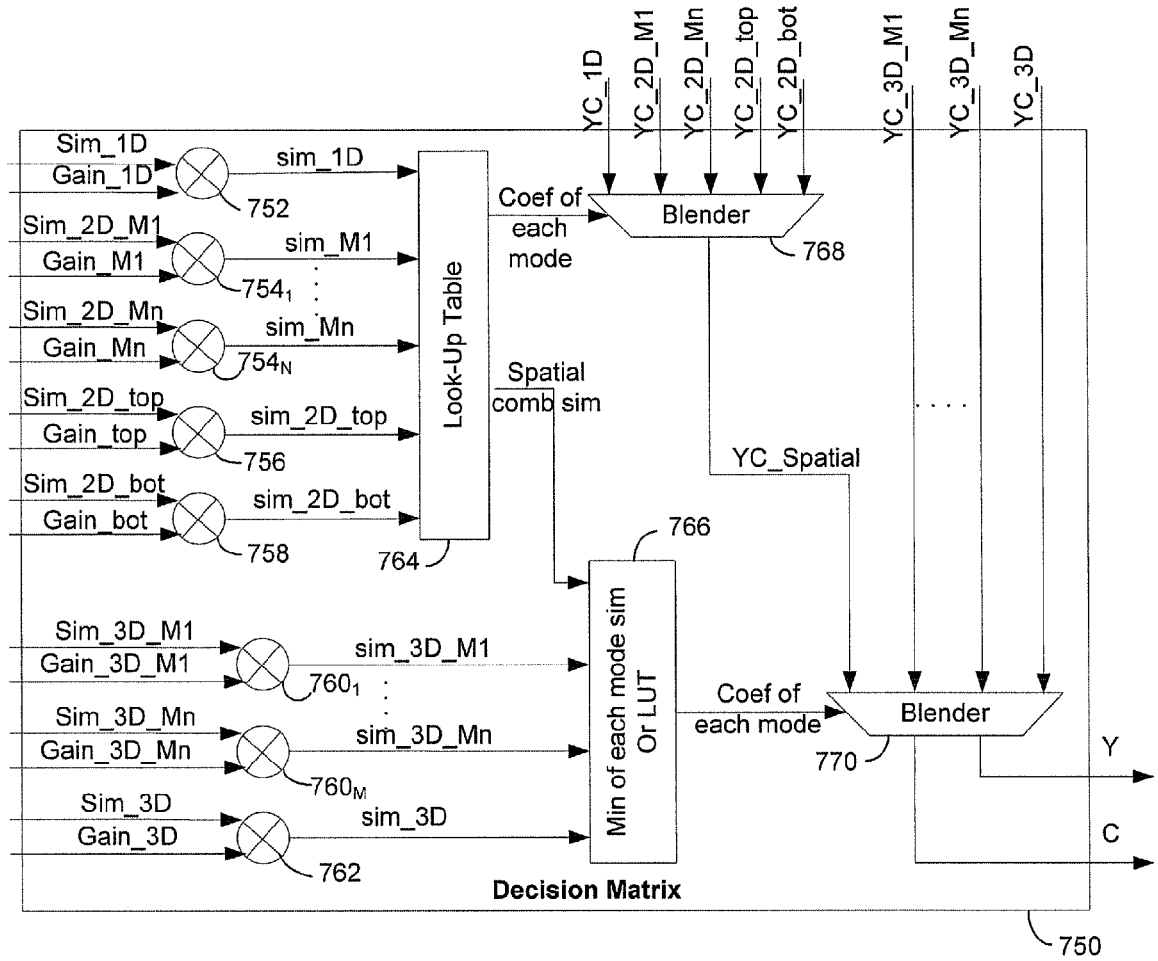
FIG. 7B is a block diagram of another embodiment of an exemplary decision matrix for Y/C separation operations, in accordance with an embodiment of the invention.

FIG. 7B is a block diagram of another embodiment of an exemplary decision matrix for Y/C separation operations, in accordance with an embodiment of the invention. Referring to FIG. 7B, there is shown an exemplary decision matrix 750. The decision matrix 750 may comprise a plurality of multipliers 752, 754$_{1...N}$, 756, 758, 760$_{1...M}$, and 762, a plurality of look-up tables 764 and 766, and a plurality of blenders 768 and 770.

The plurality of multipliers 752, 754$_{1...N}$, 756, 758, 760$_{1...M}$, and 762 may be substantially similar to the plurality of multipliers 702, 704$_{1...N}$, 706, 708, 710$_{1...M}$, and 712, and as described with respect to FIG. 7A. The plurality of look-up tables 764 and 766 may be substantially similar to the plurality of look-up tables 718 and 720, and as described with respect to FIG. 7A.

The blender 768 may comprise suitable logic, circuitry, interfaces, and/or code that may be operable to receive as inputs, the determined corresponding luma components, for example, Y__1D, Y__2D_top, Y__2D_bot, and Y__2D_M$_{1 \ldots N}$, and the determined corresponding chroma components, for example, C__1D, C__2D_top, C__2D_bot, and C__2D_M$_{1 \ldots N}$, for each of the one or more spatial filtering modes, for example, notch filter mode 602, vertical top comb filter mode 604, vertical bottom comb filter mode 606, spatial generalized comb filter modes 608$_{1 \ldots N}$. The blender 768 may also receive as inputs, the generated one or more spatial filtering mode coefficients, for example, coef__1D, coef__2D_top, coef__2D_bot, coef__2D_M$_{1 \ldots N}$.

The blender 768 may be operable to generate a spatial luma component (Y_spatial) and a spatial chroma component (C_spatial) of the sample S(M, N) of the composite video baseband signal based on blending each of the determined corresponding luma components, for example, Y__1D, Y__2D_top, Y__2D_bot, and Y__2D_M$_{1 \ldots N}$, and the determined corresponding chroma components, for example, C__1D, C__2D_top, C__2D_bot, and C__2D_M$_{1 \ldots N}$, for each of the one or more spatial filtering modes with the corresponding generated one or more spatial filtering mode coefficients, for example, coef__1D, coef__2D_top, coef__2D_bot, coef__2D_M$_{1 \ldots N}$.

For example, in accordance with an embodiment of the invention, the blender 768 may be operable to generate a spatial luma component (Y_spatial) and a spatial chroma component (C_spatial) of the sample S(M, N) of the composite video baseband signal according to the following equations:

$$Y\_spatial = (Y\_1D * coef\_1D) + (Y\_2D\_top * coef\_2D\_top) +$$
$$(Y\_2D\_bot * coef\_2D\_bot) + \left( \sum_{i=1,\ldots N} Y\_2D\_M_i * coef\_2D\_M_i \right) \text{ and}$$

$$C\_spatial = (C\_1D * coef\_1D) + (C\_2D\_top * coef\_2D\_top) +$$
$$(C\_2D\_bot * coef\_2d\_bot) + \left( \sum_{i=1,\ldots N} C\_2D\_M_i * coef\_2D\_M_i \right)$$

The blender 770 may comprise suitable logic, circuitry, interfaces, and/or code that may be operable to receive as inputs, the determined corresponding luma components, for example, Y__3D_M$_{1 \ldots M}$ and Y__3D and the determined corresponding chroma components, for example, C__3D_M$_{1 \ldots M}$ and C__3D for each of the one or more temporal filtering modes and the generated spatial luma component (Y_spatial) and the generated spatial chroma component (C_spatial) of the sample S(M, N) of the composite video baseband signal. The blender 770 may also receive as inputs, the generated one or more temporal filtering mode coefficients, for example, coef__3D_M$_{1 \ldots M}$ and coef__3D and the generated spatial coefficient (coef_spatial).

The blender 770 may be operable to generate the luma component (Y) and the chroma component (C) of the sample S(Cur, M, N) of the composite video baseband signal based on blending the determined corresponding luma components, for example, Y__3D_M$_{1 \ldots M}$ and Y__3D and the determined corresponding chroma components, for example, C__3D_M$_{1 \ldots M}$ and C__3D for each of the one or more temporal filtering modes and the generated spatial luma component (Y_spatial) and the generated spatial chroma component (C_spatial) of the sample S(M, N) of the composite video baseband signal with the corresponding generated one or more temporal filtering mode coefficients, for example, coef__3D_M$_{1 \ldots M}$ and coef__3D and the generated spatial coefficient (coef_spatial).

For example, in accordance with an embodiment of the invention, the blender 770 may be operable to generate a luma component (Y) and a chroma component (C) of the sample S(Cur, M, N) of the composite video baseband signal according to the following equations:

$$Y = (Y\_3D * coef\_3D) + \left( \sum_{i=1,\ldots M} Y\_3D\_M_i * coef\_3D\_M_i \right) \text{ and}$$

$$C = (C\_3D * coef\_3D) + \left( \sum_{i=1,\ldots M} C\_3D\_M_i * coef\_3D\_M_i \right)$$

Figure 8:
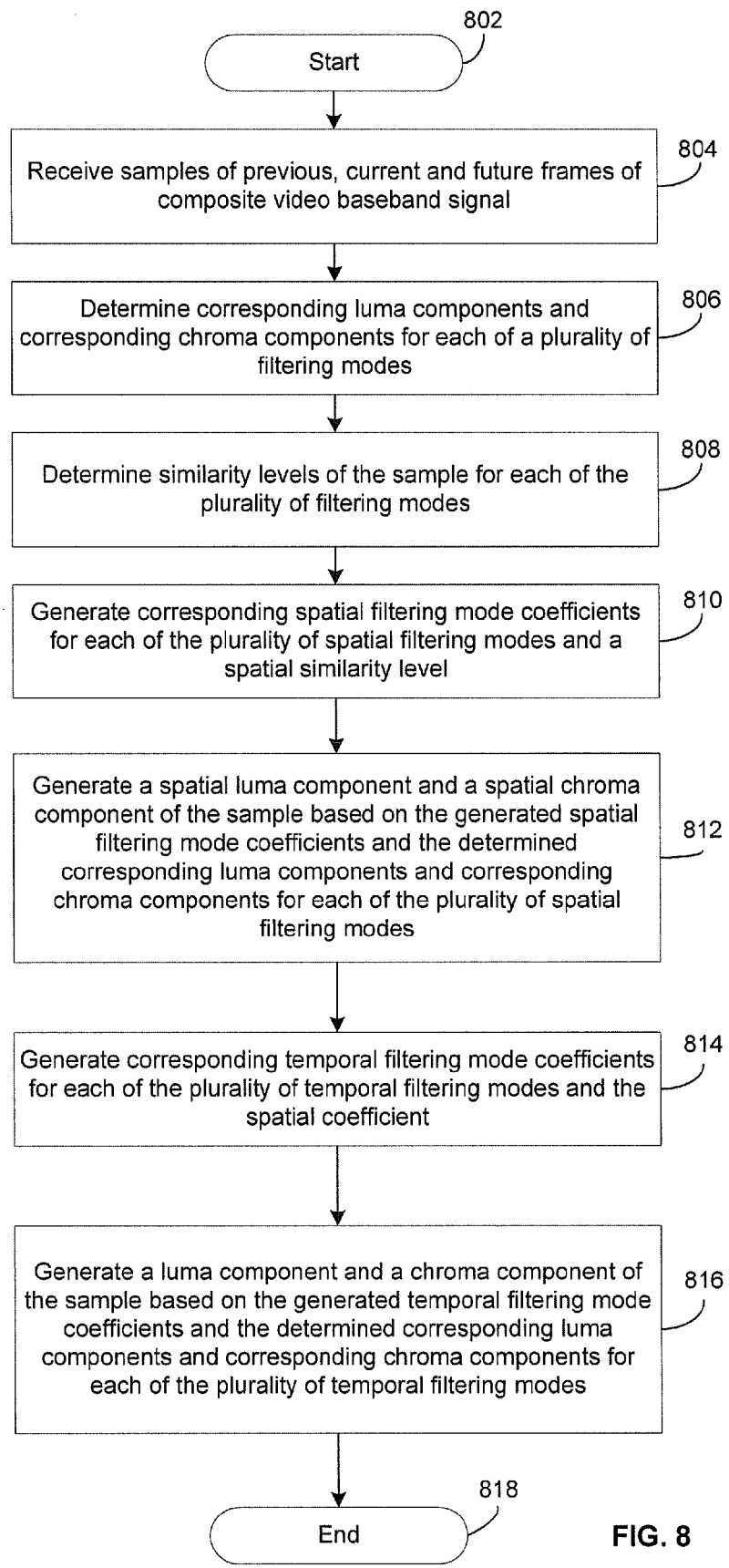
FIG. 8 is a flowchart illustrating exemplary steps for a generalized multi-dimensional filter device for Y/C separation operations, in accordance with an embodiment of the invention.

FIG. 8 is a flowchart illustrating exemplary steps for a generalized multi-dimensional filter device for Y/C separation operations, in accordance with an embodiment of the invention. Referring to FIG. 8, exemplary steps may begin at step 802. In step 804, a plurality of previous, current, and future samples of the composite video baseband signal may be received. In step 806, a corresponding luma component, for example, Y__1D, Y__2D_top, Y__2D_bot, Y__2D_M$_{1 \ldots N}$, Y__3D_M$_{1 \ldots M}$ and Y__3D, and a corresponding chroma component, for example, C__1D, C__2D_top, C__2D_bot, C__2D_M$_{1 \ldots N}$, C__3D_M$_{1 \ldots M}$ and C__3D, or a sample S(Cur, M, N) of a composite video baseband signal for each of a plurality of filtering modes, for example, notch filter mode 602, vertical top comb filter mode 604, vertical bottom comb filter mode 606, spatial generalized comb filter modes 608$_{1 \ldots N}$, temporal generalized comb filter modes 610$_{1 \ldots M}$ and temporal 3D comb filter mode 612 may be determined. In step 808, a similarity level of the sample S(Cur, M, N) corresponding to each of the plurality of filtering modes may be determined, for example, sim__1D, sim__2D_top, sim__2D_bot, sim__2D_M$_{1 \ldots N}$, sim__3D_M$_{1 \ldots M}$ and sim__3D.

In step 810, corresponding spatial filtering mode coefficients, for example, coef__1D, coef__2D_top, coef__2D_bot, coef__2D_M$_{1 \ldots N}$, for each of the plurality of spatial filtering modes and the spatial similarity level (sim_spatial) may be generated based on the determined similarity levels. In step 812, a spatial luma component (Y_spatial) and a spatial chroma component (C_spatial) of the sample S(M, N) of the composite video baseband signal may be determined based on the generated one or more spatial filtering mode coefficients, for example, coef__1D, coef__2D_top, coef__2D_bot, coef__2D_M$_{1 \ldots N}$, for each of the one or more spatial filtering modes and the determined corresponding luma components, for example, Y__1D, Y__2D_top, Y__2D_bot, and Y__2D_M$_{1 \ldots N}$, and the determined corresponding chroma components, for example, C__1D, C__2D_top, C__2D_bot, and C__2D_M$_{1 \ldots N}$, for each of the plurality of spatial filtering modes.

In step 814, one or more temporal filtering mode coefficients, for example, coef__3D_M$_{1 \ldots M}$ and coef__3D for each of the one or more temporal filtering modes, for example, temporal generalized comb filter modes 610$_{1 \ldots M}$ and temporal 3D comb filter mode 612 and the spatial coefficient (coef_spatial) may be generated based on the determined similarity levels, sim__3D_M$_{1 \ldots M}$ and sim__3D corresponding to each of the one or more temporal filtering modes and the determined spatial similarity level (sim_spatial).

In step 816, the luma component (Y) and the chroma component (C) of the sample S(Cur, M, N) of the composite video baseband signal may be generated based on the generated one or more temporal filtering mode coefficients, for example, coef_3D_M$_{1 \ldots M}$ and coef_3D for each of the one or more temporal filtering modes, the generated spatial coefficient (coef_spatial), the determined corresponding luma components, for example, Y_3D_M$_{1 \ldots M}$ and Y_3D and the determined corresponding chroma components, for example, C_3D_M$_{1 \ldots M}$ and C_3D for each of the one or more temporal filtering modes, the generated spatial luma component (Y_spatial) and the generated spatial chroma component (C_spatial) of the sample S(M, N) of the composite video baseband signal. Control then passes to end step 818.

In accordance with an embodiment of the invention, a method and system for a generalized multi-dimensional filter device may comprise one or more processors and/or circuits, for example, a video decoder 600 that may be operable to determine a corresponding luma component, for example, Y_1D, Y_2D_top, Y_2D_bot, Y_2D_M$_{1 \ldots N}$, Y_3D_M$_{1 \ldots M}$ and Y_3D, and a corresponding chroma component, for example, C_1D, C_2D_top, C_2D_bot, C_2D_M$_{1 \ldots N}$, C_3D_M$_{1 \ldots M}$ and C_3D, of a sample S(M, N) of a composite video baseband signal for each of a plurality of filtering modes, for example, notch filter mode 602, vertical top comb filter mode 604, vertical bottom comb filter mode 606, spatial generalized comb filter modes 608$_{1 \ldots N}$, temporal generalized comb filter modes 610$_{1 \ldots M}$ and temporal 3D comb filter mode 612 may be determined. A similarity level of the sample S(M, N) corresponding to each of the plurality of filtering modes may be determined, for example, sim_1D, sim_2D_top, sim_2D_bot, sim_2D_M$_{1 \ldots N}$, sim_3D_M$_{1 \ldots M}$ and sim_3D. A corresponding coefficient, for example, coef_1D, coef_2D_top, coef_2D_bot, coef_2D_M$_{1 \ldots N}$, coef_3D_M$_{1 \ldots M}$ and coef_3D for each of the plurality of filtering modes may be generated based on the determined similarity levels. A luma component (Y) and a chroma component (C) of the sample S(M, N) of the composite video baseband signal may be generated based on the generated corresponding coefficients, for example, coef_1D, coef_2D_top, coef_2D_bot, coef_2D_M$_{1 \ldots N}$, coef_3D_M$_{1 \ldots M}$ and coef_3D and the determined corresponding luma components, for example, Y_1D, Y_2D_top, Y_2D_bot, Y_2D_M$_{1 \ldots N}$, Y_3D_M$_{1 \ldots M}$ and Y_3D and the determined corresponding chroma components, for example, C_1D, C_2D_top, C_2D_bot, C_2D_M$_{1 \ldots N}$, C_3D_M$_{1 \ldots M}$ and C_3D for each of the plurality of filtering modes, for example, notch filter mode 602, vertical top comb filter mode 604, vertical bottom comb filter mode 606, spatial generalized comb filter modes 608$_{1 \ldots N}$, temporal generalized comb filter modes 610$_{1 \ldots M}$ and temporal 3D comb filter mode 612.

The one or more processors and/or circuits, for example, video decoder 600 may be operable to generate the corresponding coefficient, for example, coef_1D, coef_2D_top, coef_2D_bot, coef_2D_M$_{1 \ldots N}$, coef_3D_M$_{1 \ldots M}$ and coef_3D for each of the plurality of filtering modes, for example, notch filter mode 602, vertical top comb filter mode 604, vertical bottom comb filter mode 606, spatial generalized comb filter modes 608$_{1 \ldots N}$, temporal generalized comb filter modes 610$_{1 \ldots M}$ and temporal 3D comb filter mode 612 based on a look-up table 718 and/or 720. The one or more processors and/or circuits, for example, video decoder 600 may be operable to generate the corresponding coefficient, for example, coef_1D, coef_2D_top, coef_2D_bot, coef_2D_M$_{1 \ldots N}$, coef_3D_M$_{1 \ldots M}$ and coef_3D for each of the plurality of filtering modes, for example, notch filter mode 602, vertical top comb filter mode 604, vertical bottom comb filter mode 606, spatial generalized comb filter modes 608$_{1 \ldots N}$, temporal generalized comb filter modes 610$_{1 \ldots M}$ and temporal 3D comb filter mode 612 based on a minimum of the determined similarity levels, for example, sim_1D, sim_2D_top, sim_2D_bot, sim_2D_M$_{1 \ldots N}$, sim_3D_M$_{1 \ldots M}$ and sim_2D_top, plurality of filtering modes.

The plurality of filtering modes may comprise one or more spatial filtering modes, for example, notch filter mode 602, vertical top comb filter mode 604, vertical bottom comb filter mode 606, spatial generalized comb filter modes 608$_{1 \ldots N}$, and/or one or more temporal filtering modes, for example, temporal generalized comb filter modes 610$_{1 \ldots M}$ and temporal 3D comb filter mode 612. The generated corresponding coefficients may comprise one or more spatial filtering mode coefficients, for example, coef_1D, coef_2D_top, coef_2D_bot, coef_2D_M$_{1 \ldots N}$, and/or one or more temporal filtering mode coefficients, for example, coef_3D_M$_{1 \ldots M}$ and coef_3D. The one or more processors and/or circuits, for example, video decoder 600 may be operable to generate the one or more spatial filtering mode coefficients, for example, coef_1D, coef_2D_top, coef_2D_bot, coef_2D_M$_{1 \ldots N}$, for each of the one or more spatial filtering modes, for example, notch filter mode 602, vertical top comb filter mode 604, vertical bottom comb filter mode 606, spatial generalized comb filter modes 608$_{1 \ldots N}$, based on one or both of a look-up table 718 and/or a minimum of the determined similarity levels, for example, sim_1D, sim_2D_top, sim_2D_bot, sim_2D_M$_{1 \ldots N}$, corresponding to each of the one or more spatial filtering modes. The one or more processors and/or circuits, for example, video decoder 600 may be operable to determine a spatial similarity level (sim_spatial) based on one or both of a look-up table 718 and/or a minimum of the determined similarity levels, for example, sim_1D, sim_2D_top, sim_2D_bot, sim_2D_M$_{1 \ldots N}$, corresponding to each of the one or more spatial filtering modes.

The one or more processors and/or circuits, for example, video decoder 600 may be operable to determine a spatial coefficient (coef_spatial) based on one or both of a look-up table 720 and/or a minimum of the determined similarity levels, for example, sim_3D_M$_{1 \ldots M}$ and sim_3D corresponding to each of the one or more temporal filtering modes and the determined spatial similarity level (sim_spatial).

The one or more processors and/or circuits, for example, video decoder 600 may be operable to generate the one or more temporal filtering mode coefficients, for example, coef_3D_M$_{1 \ldots M}$ and coef_3D for each of the one or more temporal filtering modes, for example, temporal generalized comb filter modes 610$_{1 \ldots M}$ and temporal 3D comb filter mode 612 based on one or both of a look-up table 720 and/or a minimum of the determined similarity levels, sim_3D_M$_{1 \ldots M}$ and sim_3D corresponding to each of the one or more temporal filtering modes and the determined spatial similarity level (sim_spatial). The one or more processors and/or circuits, for example, video decoder 600 may be operable to generate a spatial luma component (Y_spatial) and a spatial chroma component (C_spatial) of the sample S(M, N) of the composite video baseband signal based on the generated one or more spatial filtering mode coefficients, for example, coef_1D, coef_2D_top, coef_2D_bot, coef_2D_M$_{1 \ldots N}$, for each of the one of more spatial filtering modes and the determined corresponding luma components, for example, Y_1D, Y_2D_top, Y_2D_bot, and Y_2D_M$_{1 \ldots N}$, and the determined corresponding chroma components, for example, C_1D, C_2D_top, C_2D_bot, and C_2D_M$_{1 \ldots N}$, for each of the plurality of spatial filtering modes.

The one or more processors and/or circuits, for example, video decoder 600 may be operable to generate a spatial luma component (Y_spatial) and a spatial chroma component (C_spatial) of the sample S(M, N) of the composite video baseband signal based on blending the generated one or more spatial filtering mode coefficients, for example, coef_1D, coef_2D_top, coef_2D_bot, coef_2D_$M_{1...N}$, for each of the one or more spatial filtering modes with the determined corresponding luma components, for example, Y_1D, Y_2D_top, Y_2D_bot, and Y_2D_$M_{1...N}$, and the determined corresponding chroma components, for example, C_1D, C_2D_top, C_2D_bot, and C_2D_$M_{1...N}$, for each of the one or more spatial filtering modes. The one or more processors and/or circuits, for example, video decoder 600 may be operable to generate a spatial luma component (Y_spatial) and a spatial chroma component (C_spatial) of the sample S(M, N) of the composite video baseband signal based on selecting one of the determined corresponding luma components, for example, Y_1D, Y_2D_top, Y_2D_bot, and Y_2D_$M_{1...N}$, and the determined corresponding chroma components, for example, C_1D, C_2D_top, C_2D_bot, and C_2D_$M_{1...N}$, for each of the one or more spatial filtering modes corresponding to one of the generated one or more spatial filtering mode coefficients, for example, coef_1D, coef_2D_top, coef_2D_bot, coef_2D_$M_{1...N}$.

The one or more processors and/or circuits, for example, video decoder 600 may be operable to generate the luma component (Y) and the chroma component (C) of the sample S(Cur, M, N) of the composite video baseband signal based on the generated one or more temporal filtering mode coefficients, for example, coef_3D_$M_{1...M}$ and coef_3D for each of the one or more temporal filtering modes, the generated spatial coefficient (coef_spatial), the determined corresponding luma components, for example, Y_3D_$M_{1...M}$ and Y_3D and the determined corresponding chroma components, for example, C_3D_$M_{1}$...M and C_3D for each of the one or more temporal filtering modes, the generated spatial luma component (Y_spatial) and the generated spatial chroma component (C_spatial) of the sample S(M, N) of the composite video baseband signal.

The one or more processors and/or circuits, for example, video decoder 600 may be operable to generate the luma component (Y) and the chroma component (C) of the sample S(Cur, M, N) of the composite video baseband signal based on blending the generated one or more temporal filtering mode coefficients, for example, coef_3D_$M_{1...M}$ and coef_3D for each of the one or more temporal filtering modes and the generated spatial coefficient (coef_spatial) with the determined corresponding luma components, for example, Y_3D_$M_{1...M}$ and Y_3D and the determined corresponding chroma components, for example, C_3D_$M_{1...M}$ and C_3D for each of the one or more temporal filtering modes and the generated spatial luma component (Y_spatial) and the generated spatial chroma component (C_spatial) of the sample S(M, N) of the composite video baseband signal. The one or more processors and/or circuits, for example, video decoder 600 may be operable to generate the luma component (Y) and the chroma component (C) of the sample S(Cur, M, N) of the composite video baseband signal based on selecting one of the determined corresponding luma components, for example, Y_3D_$M_{1...M}$ and Y_3D and the determined corresponding chroma components, for example, C_3D_$M_{1...M}$ and C_3D for each of the one or more temporal filtering modes and the generated spatial luma component (Y_spatial) and the generated spatial chroma component (C_spatial) of the sample S(M, N) of the composite video baseband signal corresponding to one of the generated one or more temporal filtering mode coefficients, for example, coef_3D_$M_{1...M}$ and coef_3D for each of the one or more temporal filtering modes and the generated spatial coefficient (coef_spatial).

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a generalized multi-dimensional filter device.

Accordingly, the present invention may be realized in hardware or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video processing, the method comprising performing by one or more processors and/or circuits:
    determining a corresponding luma component and a corresponding chroma component of a sample of a composite video baseband signal for each of a plurality of filtering modes;
    determining a similarity level of said sample corresponding to each of said plurality of filtering modes;
    generating a corresponding coefficient for each of said plurality of filtering modes based on said determined similarity levels; and
    generating a luma component and a chroma component of said sample of said composite video baseband signal based on said generated corresponding coefficients and said determined corresponding luma components and said determined corresponding chroma components for each of said plurality of filtering modes.

2. The method according to claim 1, comprising generating said corresponding coefficient for each of said plurality of filtering modes based on a look-up table.

3. The method according to claim 1, comprising generating said corresponding coefficient for each of said plurality of filtering modes based on a minimum of said determined similarity levels corresponding to each of said plurality of filtering modes.

4. The method according to claim 1, wherein said plurality of filtering modes comprises one or more spatial filtering modes and/or one or more temporal filtering modes.

5. The method according to claim 4, wherein said generated corresponding coefficients comprises one or more spatial filtering mode coefficients and/or one or more temporal filtering mode coefficients.

6. The method according to claim 5, comprising generating said one or more spatial filtering mode coefficients for each of said one or more spatial filtering modes based on one or both of: a look-up table and/or a minimum of said determined similarity levels corresponding to each of said one or more spatial filtering modes.

7. The method according to claim 6, comprising determining a spatial similarity level of said sample based on one or both of: a look-up table and/or a minimum of said determined similarity levels corresponding to each of said one or more spatial filtering modes.

8. The method according to claim 7, comprising generating a spatial coefficient based on one or both of: a look-up table and/or a minimum of said determined similarity levels corresponding to each of said one or more temporal filtering modes and said determined spatial similarity level.

9. The method according to claim 8, comprising generating said one or more temporal filtering mode coefficients for each of said one or more temporal filtering modes based on one or both of: a look-up table and/or a minimum of said determined similarity levels corresponding to each of said one or more temporal filtering modes and said generated spatial coefficient.

10. The method according to claim 9, comprising generating a spatial luma component and a spatial chroma component of said composite video baseband signal based on said generated one or more spatial filtering mode coefficients for each of said one or more spatial filtering modes and said determined corresponding luma components and said determined corresponding chroma components for each of said plurality of spatial filtering modes.

11. The method according to claim 10, comprising generating a spatial luma component and a spatial chroma component of said sample of said composite video baseband signal based on blending said generated one or more spatial filtering mode coefficients for each of said one or more spatial filtering modes with said determined corresponding luma components and said determined corresponding chroma components for each of said one or more spatial filtering modes.

12. The method according to claim 10, comprising generating a spatial luma component and a spatial chroma component of said sample of said composite video baseband signal based on selecting one of said determined corresponding luma components and said determined corresponding chroma components for each of said one or more spatial filtering modes corresponding to one of said generated one or more spatial filtering mode coefficients.

13. The method according to claim 10, comprising generating said luma component and said chroma component of said sample of said composite video baseband signal based on said generated one or more temporal filtering mode coefficients for each of said one or more temporal filtering modes, said generated spatial coefficient, said determined corresponding luma components and said determined corresponding chroma components for each of said one or more temporal filtering modes, said generated spatial luma component and said generated spatial chroma component of said sample of said composite video baseband signal.

14. The method according to claim 10, comprising generating said luma component and said chroma component of said sample of said composite video baseband signal based on blending said generated one or more temporal filtering mode coefficients for each of said one or more temporal filtering modes and said generated spatial coefficient with said determined corresponding luma components and said determined corresponding chroma components for each of said one or more temporal filtering modes and said generated spatial luma component and said generated spatial chroma component of said sample of said composite video baseband signal.

15. The method according to claim 10, comprising generating said luma component and said chroma component of said sample of said composite video baseband signal based on selecting one of said determined corresponding luma components and said determined corresponding chroma components for each of said one or more temporal filtering modes and said generated spatial luma component and said generated spatial chroma component of said sample of said composite video baseband signal corresponding to one of said generated one or more temporal filtering mode coefficients and said generated spatial coefficient.

16. A system for video processing, the system comprising:
one or more processors and/or circuits that are operable to:
determine a corresponding luma component and a corresponding chroma component of a sample of a composite video baseband signal for each of a plurality of filtering modes;
determine a similarity level of said sample corresponding to each of said plurality of filtering modes;
generate a corresponding coefficient for each of said plurality of filtering modes based on said determined similarity levels; and
generate a luma component and a chroma component of said sample of said composite video baseband signal based on said generated corresponding coefficients and said determined corresponding luma components and said determined corresponding chroma components for each of said plurality of filtering modes.

17. The system according to claim 16, wherein said one or more processors and/or circuits are operable to generate said corresponding coefficient for each of said plurality of filtering modes based on a look-up table.

18. The system according to claim 16, wherein said one or more processors and/or circuits are operable to generate said corresponding coefficient for each of said plurality of filtering modes based on a minimum of said determined similarity levels corresponding to each of said plurality of filtering modes.

19. The system according to claim 16, wherein said plurality of filtering modes comprises one or more spatial filtering modes and/or one or more temporal filtering modes.

20. The system according to claim 19, wherein said generated corresponding coefficients comprises one or more spatial filtering mode coefficients and/or one or more temporal filtering mode coefficients.

21. The system according to claim 20, wherein said one or more processors and/or circuits are operable to generate said one or more spatial filtering mode coefficients for each of said one or more spatial filtering modes based on one or both of: a look-up table and/or a minimum of said determined similarity levels corresponding to each of said one or more spatial filtering modes.

22. The system according to claim 21, wherein said one or more processors and/or circuits are operable to determine a spatial similarity level of said sample based on one or both of: a look-up table and/or a minimum of said determined similarity levels corresponding to each of said one or more spatial filtering modes.

23. The system according to claim 22, wherein said one or more processors and/or circuits are operable to generate a spatial coefficient based on one or both of: a look-up table and/or a minimum of said determined similarity levels corresponding to each of said one or more temporal filtering modes and said determined spatial similarity level.

24. The system according to claim 23, wherein said one or more processors and/or circuits are operable to generate said one or more temporal filtering mode coefficients for each of said one or more temporal filtering modes based on one or both of: a look-up table and/or a minimum of said determined similarity levels corresponding to each of said one or more temporal filtering modes and said determined spatial similarity level.

25. The system according to claim 24, wherein said one or more processors and/or circuits are operable to generate a spatial luma component and a spatial chroma component of said sample of said composite video baseband signal based on said generated one or more spatial filtering mode coefficients for each of said one or more spatial filtering modes and said determined corresponding luma components and said determined corresponding chroma components for each of said plurality of spatial filtering modes.

26. The system according to claim 25, wherein said one or more processors and/or circuits are operable to generate a spatial luma component and a spatial chroma component of said sample of said composite video baseband signal based on blending said generated one or more spatial filtering mode coefficients for each of said one or more spatial filtering modes with said determined corresponding luma components and said determined corresponding chroma components for each of said one or more spatial filtering modes.

27. The system according to claim 25, wherein said one or more processors and/or circuits are operable to generate a spatial luma component and a spatial chroma component of said sample of said composite video baseband signal based on selecting one of said determined corresponding luma components and said determined corresponding chroma components for each of said one or more spatial filtering modes corresponding to one of said generated one or more spatial filtering mode coefficients.

28. The system according to claim 25, wherein said one or more processors and/or circuits are operable to generate said luma component and said chroma component of said sample of said composite video baseband signal based on said generated one or more temporal filtering mode coefficients for each of said one or more temporal filtering modes, said generated spatial coefficient, said determined corresponding luma components and said determined corresponding chroma components for each of said one or more temporal filtering modes, said generated spatial luma component and said generated spatial chroma component of said sample of said composite video baseband signal.

29. The system according to claim 28, wherein said one or more processors and/or circuits are operable to generate said luma component and said chroma component of said sample of said composite video baseband signal based on blending said generated one or more temporal filtering mode coefficients for each of said one or more temporal filtering modes and said generated spatial coefficient, with said determined corresponding luma components and said determined corresponding chroma components for each of said one or more temporal filtering modes and said generated spatial luma component and said generated spatial chroma component of said sample of said composite video baseband signal.

30. The system according to claim 28, wherein said one or more processors and/or circuits are operable to generate said luma component and said chroma component of said sample of said composite video baseband signal based on selecting one of said determined corresponding luma components and said determined corresponding chroma components for each of said one or more temporal filtering modes and said generated spatial luma component and said generated spatial chroma component of said sample of said composite video baseband signal corresponding to one of said generated one or more temporal filtering mode coefficients and said generated spatial coefficient.

\* \* \* \* \*